United States Patent [19]
Kanack

[11] Patent Number: 5,526,172
[45] Date of Patent: Jun. 11, 1996

[54] MICROMINIATURE, MONOLITHIC, VARIABLE ELECTRICAL SIGNAL PROCESSOR AND APPARATUS INCLUDING SAME

[75] Inventor: Brad Kanack, DeSoto, Tex.

[73] Assignee: Texas Instruments Incorporated, Dallas, Tex.

[21] Appl. No.: 97,824

[22] Filed: Jul. 27, 1993

[51] Int. Cl.$^6$ .................................................. G02B 26/00
[52] U.S. Cl. ........................ 359/291; 359/315; 359/846
[58] Field of Search .................................. 359/290, 291, 359/297, 315, 846, 849; 330/7

[56] References Cited

U.S. PATENT DOCUMENTS

| | | | |
|---|---|---|---|
| 3,746,785 | 7/1973 | Goodrich | 359/291 |
| 4,119,368 | 10/1978 | Yamazaki | 359/291 |
| 4,146,307 | 3/1979 | Gaffard | 359/291 |
| 4,805,038 | 2/1989 | Seligson | 359/290 |
| 5,124,834 | 6/1992 | Cusano et al. | 359/291 |
| 5,172,262 | 12/1992 | Hornbeck | 359/846 |

Primary Examiner—Georgia Y. Epps
Assistant Examiner—Thomas Robbins
Attorney, Agent, or Firm—Robert C. Klinger; James C. Kesterson; Richard L. Donaldson

[57] ABSTRACT

A microminiature, variable electrical device, such as a capacitor (40a), comprises an elemental DMD SLM (40'), which includes a substrate (43) and a member (145) spaced therefrom and mounted for movement by appropriate facilities (42, 44). A control signal (102) is applied to the movable member (145) to produce an electric field between it and either the substrate (43) or an associated control electrode (46a). The field moves the member (145) toward or away from either the substrate (43) or an associated output electrode (46b) to selectively adjust the spacing therebetween. The field is produced by addressing circuitry (45) associated with the substrate (43). The movable member (145) and either the substrate (43) or the output electrode (46b) function as capacitor plates, and the spacing determines the capacitance thereof. The capacitor (40a) may be placed in series (FIG. 4) or in parallel (FIG. 3) with an input signal (114) applied to the movable member (145). The movable member (145), substrate (43), control electrode (46a), output electrode (46b), addressing circuitry (45), and other elements of the capacitor (40a) comprise a monolithic structure resulting from the use of MOS, CMOS or similar fabrication techniques. Multiple capacitors may be included in transmission lines (FIG. 20), antennae (FIG. 22), couplers (FIG. 21), waveguides FIG. 25) and other apparatus for digital or analog tuning or capacitance adjustment thereof by selective operation of the addressing circuitry (45).

130 Claims, 12 Drawing Sheets

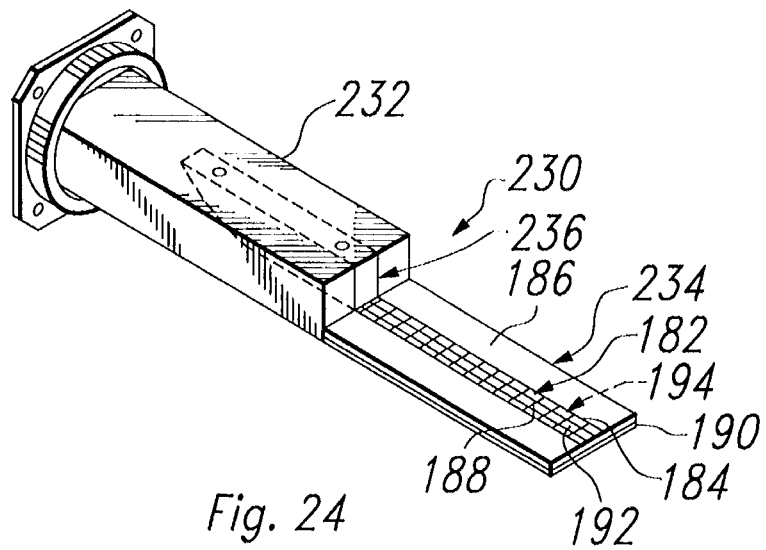
Fig. 24
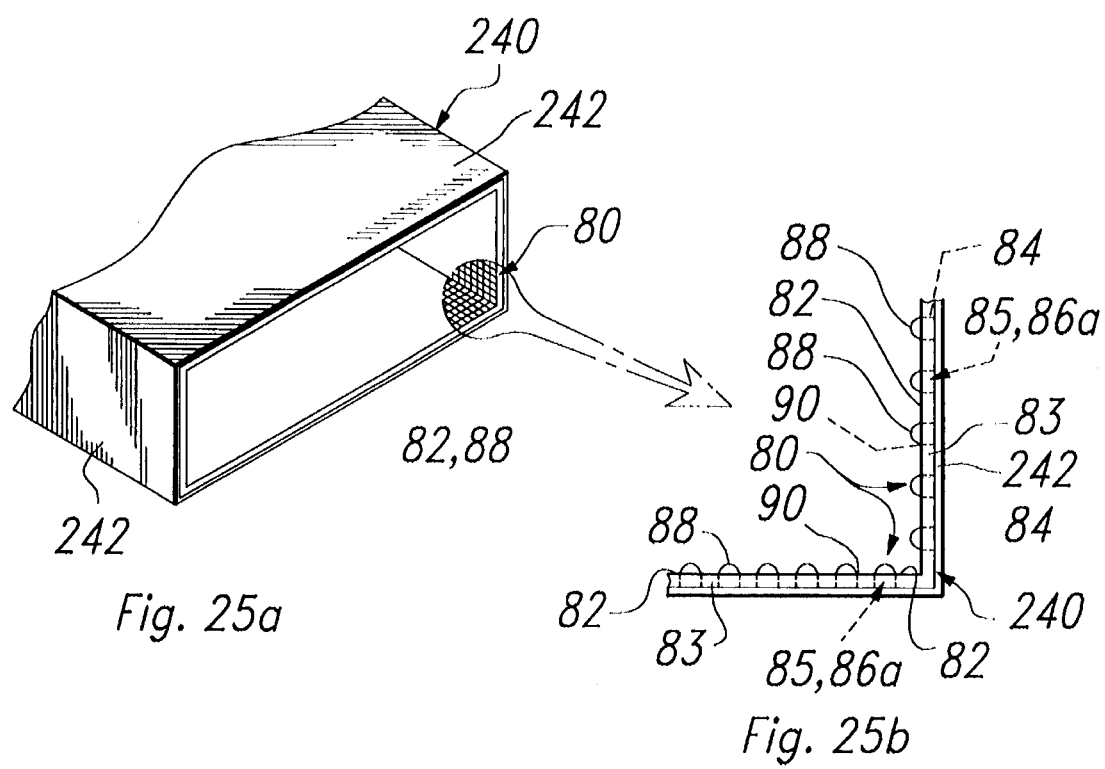
Fig. 25a
Fig. 25b

MICROMINIATURE, MONOLITHIC, VARIABLE ELECTRICAL SIGNAL PROCESSOR AND APPARATUS INCLUDING SAME

BACKGROUND OF THE INVENTION

1. Field of the Invention

The present invention relates to a microminiature, monolithic, variable electrical device, and, more particularly, to such a device constituted of a basic "building block" comprising a deformable-mirror spatial light modulator ("SLM") functioning as a capacitor or switch.

2. Prior Art

An SLM is made up of an array of small mirrors or reflectors, each of which is capable of acting as a selective light-reflective pixel. Each pixel reflects incident light along a path which depends on the position or orientation of its mirror. Typically, each pixel mirror is movable (e.g. by deflection or deformation) between a normal, first position or orientation and one or more second positions or orientations. In only one position—either the normal position or one of the second positions—each pixel directs the incident light along a selected path to a primary light-receiving site, for example, into an optical system and from there onto a viewing surface or light-sensitive paper. In all other pixel mirror positions, incident light is not directed along the selected path to the primary site; rather, it is directed to either a secondary site or to a "light sink" which absorbs or eliminates the light which, therefore, does not reach the light-receiving site.

An array of pixels may be used to reflect incident light in a pattern to the primary site. A pixel array may take the form of a square or other othogonal matrix. In this event, the position of each pixel mirror, which position is individually controllable by associated addressing facilities, may be altered in a rasterized display to generate a video presentation. See commonly assigned U.S. Pat. Nos., 5,079,544; 5,061,049; 4,728,185 and 3,600,798. See also U.S. Pat. Nos. 4,356,730; 4,229,732; 3,896,338 and 3,886,310. A pixel array may also take other forms, for example, that of a rectangular matrix, the length of which is much greater than its width. In this latter event, the positions of the pixel mirrors, as determined by their associated addressing facilities, may be individually, selectively altered so that the reflected light prints characters in quasi-line-at-a-time fashion on light sensitive paper. See commonly assigned U.S. Pat. Nos. 5,101,236 and 5,041,851. In both events, and in other use environments, appropriate arrays and configurations of pixels/mirrors enable SLM's to modulate light in amplitude-dominant or phase-dominant modes.

There are at least four genera of SLM's: electro-optic, magneto-optic, liquid crystal and deflectable (or deformable) mirror. The latter genus, often referred to as a DMD—Deflectable (or Deformable) Mirror Device or Digital Micromirror Device—includes a micromechanical array of electronically addressable mirror elements. The mirror elements are reflectors each of which is individually movable (e.g., deflectable or deformable), as by rotation, deformation or piston-like, up-and-down movement into selective reflecting configurations. As noted above, each mirror constitutes a pixel which is capable of mechanical movement (deflection or deformation) in response to an electrical input. Light incident on each mirror may be selectively modulated in its direction and/or phase by reflection from each selectively moved or positioned mirror. To date, DMD SLM's have found use in optical correlation (e.g., in Van der Lugt matched filter correlators), spectrum analysis, optical crossbar switching, frequency excision, high definition displays (e.g. television), display and display projection, xerographic printing and neural networks.

There are several species of the genus "DMD SLM", including cantilever- and torsion- beam type elastomer type, and membrane type. A fourth species of DMD SLM which is structurally related to both beam types, but is operationally related to the elastomer and membrane types, is the so-called flexure-beam type. Addressing—that is, selectively moving—the pixels of DMD SLM's has been achieved by electron-beam input, optically or, as preferred today, by monolithic, thin film or hybrid integrated circuits, which include MOS, CMOS and functionally similar devices.

Specifically, it has been found convenient to produce integrated addressing circuits monolithically with the pixels using conventional MOS/CMOS processing techniques to form the addressing circuits in and on a substrate (typically silicon) with the pixels spaced above the substrate. The addressing circuits can be planarized and overlain by their respective pixels to limit light penetration thereinto, thereby reducing light diffraction from the addressing circuits and from the substrate. The addressing circuits may affect pixel positions in analog, bistable (binary) and tristable fashions.

Cantilever-beam and torsion-beam types of DMD SLM's each comprise a relatively thick (for rigidity and low compliance) mirror or reflective metal member typically integral with and supported at its edges by one or two relatively thin (for high compliance) cantilever beams (or springs) or torsion beams (or springs). Each mirror is structurally supported by its beams and separated from its associated addressing circuit and from an control or address electrode which is a part of or controlled by the addressing circuit, by a spacer or support post to which the beams are connected or attached.

Absent a deflecting force applied to each mirror or metal member, the mirror is maintained in its normal position by its beam(s). When the control or address electrode is energized by having a voltage from the addressing circuit applied thereto, the resulting electric field moves a portion of the mirror aligned with the electrode along the field lines. Such movement results from coulombic or electrostatic attraction of the portion of the mirror toward (or less typically repulsion away from) the electrode. Cantilever or torsional bending occurs preferentially at the thin beam(s). Such bending stores potential energy in the beam(s) associated with the deflected mirror. The stored potential energy, which tends to return the mirror to its normal position, is effective to achieve such return when the control or address electrode no longer attracts (or repels) it.

Once the addressing circuit and its control or address electrode are formed in or on the substrate, a planarizing organic photo-resist may be spun onto the substrate. A thin metal layer, such as aluminum, is the formed on the smooth surface of the photoresist, and the layer is patterned to form precursors of the mirrors and their associated beams. The thickness of the mirror precursor, but not the beam precursors, may be increased by selective deposition, masking, etching and related MOS/CMOS-like procedures. The photoresist is removed from under the mirror and beam precursors to form a well or air gap between each mirror, on one hand, and its address electrodes and the substrate, on the other hand.

During deflection, the attracted mirror portions move into and out of the wells. The direction taken by reflected, incident light depends on the position or orientation of each mirror and, hence, on the energization state of the associated control or address electrode. In this type of DMD SLM the thick mirrors are and remain relatively flat, with their positions or orientations relative to the incident light and the light-receiving site being selectively altered to determine the path of reflected light.

One early type of DMD SLM—the elastomer type—includes a metallized, relatively thick elastomer layer. A later, related type of DMD SLM includes a relatively thin metallized polymer membrane stretched over a spacer grid or other support structure. The undeformed planar elastomer layer separates the metal layer thereon from underlying addressing facilities. The spacer grid effected an air gap or separation between grid-delineated segments of the normally undeformed and planar membrane and corresponding underlying addressing facilities. Each segment of the metal layer on the elastomer and the membrane constitutes a pixel. Engergization of a control or address electrode associated with each metal layer each metal layer segment electrostatically attracts (or repels) the metal segment to curvilinearly deform the associated, normally flat, related elastomer or membrane segment out of its normal, undeformed, planar configuration and toward (or away from) the electrode, whereupon the curvilinearly deformed metal segment acts as a miniature spherical, parabolic or other curved mirror.

Deformation of the elastomer and membrane stores potential energy therein. Deenergization of the control or address electrode permits the stored potential energy in the elastomer and membrane segment to return it to its normal flat configuration. Incident light reflected by each miniature mirror may be concentrated into a relatively narrow cone that is rotationally symmetric. Each pixel could, therefore, be associated with a Schlieren stop, comprising a single, central obscuration having a position and size to block the light reflected by the flat or unmodulated pixel mirrors. Modulated, curved or deformed pixel mirrors direct a circular patch of light onto the plane of the stop; the patch is centered on, but is now larger than, the stop's central obscuration and, therefore, traverse a selected direction and reaches a selected site.

As with DMD SLM's of the beam type, DMD SLM's of the membrane type have also recently been produced by forming a hybrid integrated assembly comprising an array of relatively thick, low compliance, separated, flat pixel mirrors each supported by relatively thin high compliance members. The members may, as in the past, be metallized segments of a polymer membrane or separate metallized polymer membranes. More typically, the members are segments of a compliant metal membrane or thin, stretchable and highly compliant or projections connected to or integral with their mirrors. The metal projections (or metal membrane, as the case may be) space the mirrors a first distance above a silicon or other substrate having formed therein and thereon addressing circuits. Underlying addressing circuits are separated by air gaps from their associated pixel mirrors when the latter reside in their normal positions. When an addressing circuit is appropriately energized, its pixel mirror is displaced or deflected toward the substrate by electrostatic or coulombic attraction. If the mirrors and the metal membrane or the metal projections are of similar thinness, the displaced mirror curvilinearly deforms. If the mirrors are substantially thicker than the surrounding metal membrane or the metal projections, each displaced mirror remains essentially flat while the metal projections (or the metal membrane) immediately stretch and deform to permit the mirrors to deflect up-and-down in piston-like fashion. The resultant displacement pattern—of the curvilinearly or transversely displaced mirrors—produces a corresponding amplitude or phase modulation pattern for reflected light.

A DMD SLM of the flexure-beam type includes a relatively thick flat mirror supported by a plurality of relatively thin cantilever-torsion beams. In an exemplary flexure-beam type of DMD SLM, the mirror is a rectangle or a square and each beam extends partially along a respective side of the mirror from a spacer or support post to a corner of the beam. In this type of SLM the beams extend parallel to the mirror's sides, while in the cantilever- and torsion-beam SLM's, the beams typically extend generally perpendicularly or acutely away from the sides of the mirrors.

When a mirror of a flexure-beam device is attracted by its control or address electrode, the beams undergo primary cantilever bending and secondary torsional bending to effect piston-like movement or deflection of the flat mirror with very slight turning of the flat mirror about an axis parallel to the direction of piston-like deflection and perpendicular to the mirror.

Further general information on SLM's may be obtained from a paper entitled "Deformable-Mirror Spatial Light Modulators," by Larry J. Hornbeck, presented at the *SPIE Critical Review Series, Spatial Light Modulators and Applications III*, in San Diego, Calif. on Aug. 7–8, 1989 and published in Volume 1150, No. 6, pages 86–102 of the related proceedings.

All DMD SLM's comprise an array of individually movable (deflectable or deformable) mirrors, pixels or light-reflecting surfaces. As discussed in commonly assigned U.S. Pat. No. 5,061,049, DMD's have been recognized as also comprising, in effect, air gap capacitors. Apparently, however, the capacitive nature of DMD SLM's has been relied on primarily for analysis of the operation of the DMD's. That is, while the optical characteristics of DMD SLM's have, and continue to be exploited, little work has been done which capitalizes on the inherent electrical or non-light-reflecting nature of these devices.

One object of the present invention is the provision of a microminiature, monolithic, variable electrical device, such as a capacitor or switch, comprising a DMD, qua or switch, and of various apparatus comprising or including such a device. Apparatus utilizing variable DMD devices, such as capacitors and switches, includes transmission lines (such as variable impedance microstrip lines); variable impedance matching, transforming and filter networks; variable-impedance or frequency-agile antennae (including patch, spiral and slot) which are tunable as to radiation pattern, frequency and wavelength; variable-impedance or frequency-agile couplers (including symmetric, asymmetric and rat race); variable FIN lines associated with waveguides; waveguides per se, switches for optical waveguides and electrical transmission lines; circuit operational controllers, for example, to tune compensate or control high frequency oscillators; and true time-delay networks for phased array antennas. Because of the operating mode of DMD's, various apparatus in which the DMD-derived devices of the present invention are included, may be digitally or selectively variable or tunable.

SUMMARY OF THE INVENTION

With the above and other objects in view, a preferred aspect of the present invention contemplates a microminiature, monolithic, variable electrical capacitor capable of affecting a time-varying input signal.

The capacitor includes a substrate. A member, which may be electrically conductive, is monolithically formed with and spaced from the substrate. The member and the substrate act as the respective plates of a parallel plate capacitor.

A mounting facility, such as a compliant beam, membrane or hinge, mounts the member for deflection of a portion thereof toward and away from the substrate. The mounting facility stores potential energy therein when the beam portion deflects out of a normal position toward or away from the substrate. The stored energy tends to return the deflected member portion to its normal position.

A facility selectively deflects the member portion to vary the capacitance. The deflecting facility may comprise a control electrode spaced from the beam in the direction of deflection of the beam portion toward and away from the substrate. The control electrode and the beam are capable of having a control signal impressed therebetween. This control signal produces a field between the beam portion and the control electrode. The field deflects the beam portion out of its normal position toward or away from the substrate. The control electrode may be a conductor formed on the substrate or may be a region of the substrate itself.

Facilities are provided for applying the input signal to the capacitor. The input signal is affected as the capacitance of the capacitor varies.

The mounting facility may be, constitute a metallic or elastomeric membrane, and may be integrally formed with the member and with the input-signal-applying facility. The mounting facility may also include a torsion beam or a cantilever beam or may be a flexure system made up of a plurality of combined cantilever and torsion beams. Deflection of the member may be rotational or piston-like.

The mounting facility may also include an insulative spacer or a conductive post supporting the beam or membrane, which has formed therein a well residing below the member. The spacer or post are preferably monolithically formed with the other elements. The member moves into and out of the well as it deflects toward and away from the substrate.

In one embodiment, the control electrode is a region of the substrate itself and the control signal is applied between the substrate region and the member. The facility for applying the input signal includes a conductive input path and a conductive output path oppositely connected to the member so that the input signal passes through the member. More specifically, the control signal may be applied between the substrate region and one of the conductive paths connected to the member. In this embodiment, the substrate region may be grounded and the capacitor may be effectively in shunt with the input signal.

In another embodiment, an electrically insulative dielectric layer on the substrate supports the control electrode on, and insulates it from, the substrate. The control signal is applied between the control electrode and the member. The facilities for applying the input signal include a conductive input path connected to the member and a conductive output path spaced from the member in the direction of its deflection. The output path is supported on and insulated from the substrate so that the input signal is applied by the member to the output path acting as one plate of the capacitor. The control signal may be applied between the control electrode and the conductive input path. In this embodiment, the capacitor may be put effectively in series with the input signal.

Typically, the input signal is time-varying, while the control signal has a frequency substantially less than that of the input signal. Preferably, the control signal is substantially non-time-varying. Indeed, the frequency of the input signal is preferably sufficiently high so with respect to the resonant frequency of the member so that the member cannot deflect in response thereto and is essentially "blind" to the input signal as far as deflection is concerned. Contrariwise, the frequency of the control signal is sufficiently low so that the beam deflects in synchronism therewith. Also preferably, the input signal and the control signal are superimposed.

The amount, frequency, mode and other characteristics of member movement may be selectively adjusted. Adjustment may be achieved, for example, by selective removal of material from the member (to decrease its mass and area) or from the member (to alter its compliance). Such removal may be effected by the use of concentrated light energy, for example from a laser trimmer.

The capacitor of the present invention may be included as an element of or a portion of any of the devices listed in the paragraph preceding this SUMMARY so that the impedance and impedance-related characteristics of the devices may be selectively altered.

In a broader aspect, the present invention contemplates a microminiature, monolithic device for affecting an electrical input signal in response to a control signal. The device includes a substrate and a movable member which normally occupies a first position. In the first position, the member affects the input signal in a first mode. When the member is not in the first position it affects the input signal in a second mode. Facilities mount the member spaced from the substrate for movement toward and away from the substrate. The mounting facilities store energy therein when the member moves out of the first position. The stored energy biases the member toward the first position.

The input signal is applied to the device and a control signal is applied to the member. Facilities respond to the control signal to selectively move the member out of its first position to consequently selectively alter the mode in which the member affects the input signal.

In preferred embodiments of the broader aspect, the member is electrically conductive and the application of the control signal thereto produces an electrostatic field acting thereon. The field moves the member out of the first position.

A specific device resulting from the broader aspects of the invention is a variable capacitor, in which the movable member is one plate of the capacitor, movement of the member altering the capacitance of the capacitor. The input signal and the control signal may both be applied to the member. The path taken by the input signal may be in parallel or in series with the alterable capacitance. Preferably, movement of the capacitor is toward the substrate to increase the capacitance from a minimum value, although movement may be away from the substrate to decrease the capacitance from a maximum value.

Another specific device resulting from the broader aspects of the invention is a waveguide. In the waveguide, the movable member forms a coplanar portion of the interior surface of the waveguide in the first position thereof. Movement of the member out of the first position is away from the substrate and from the waveguide wall. Such movement effectively decreases the cross-section of the waveguide along a line generally parallel to the line of movement of the member.

The input signal may be time varying, and the member may be varyingly deflected with respect to time. The frequency of the deflection of the member is, in preferred embodiments, independent of the frequency of the input signal, and is preferably smaller than the frequency of the input signal. A non-linear capacitor results when the member is deflected at a frequency which is substantially the same as the frequency of the input signal. This deflection may be about or with respect to a first, normal position of the member which is set by the control signal.

BRIEF DESCRIPTION OF THE DRAWING

FIG. 24 is a generalized perspective view of an array of variable capacitors comprising DMD SLM's pursuant to the present invention which is used in a waveguide-to-microstrip transition; and FIG. 25(a) and 25(b) are an end, perspective view and a magnified view of a portion thereof, both illustrating the use of multiple DMD SLM's operating as movable members for altering the electrical characteristics of a waveguide into which the members are incorporated.

DETAILED DESCRIPTION

Figure 2:
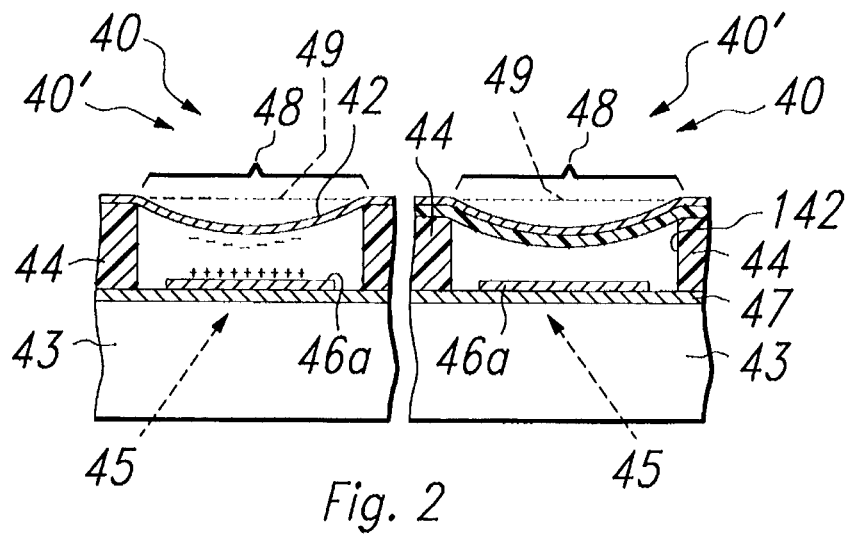
FIG. 2 is a generalized, sectioned side view of two types of variable electrical capacitors in accordance with the principles of the present invention, the capacitors being constituted of two membrane type of DMD SLMs.
Figure 3:
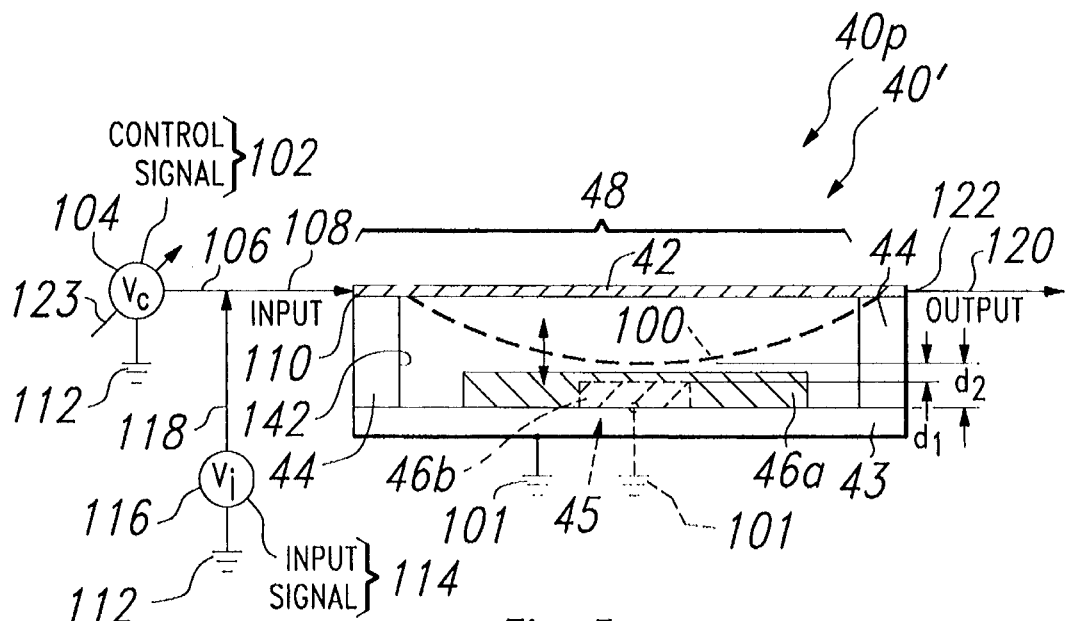
FIG. 3 is a schematic depiction of a DMD SLM used as a variable capacitor according to the present invention and electrically connected to operate as a shunt or parallel capacitance.
Figure 4:
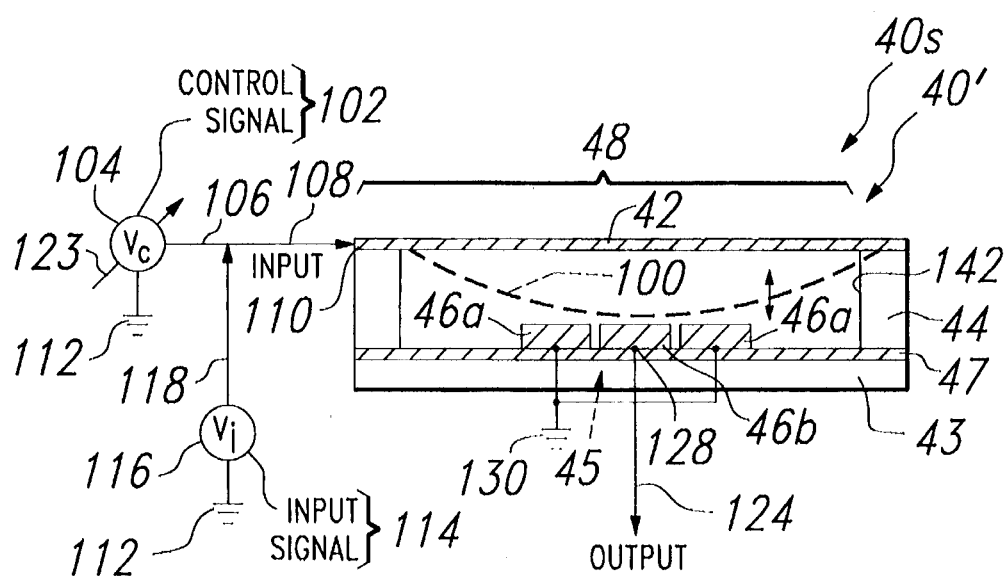
FIG. 4 is a schematic depiction of a DMD SLM used as a variable capacitor according to the present invention and electrically connected to operate as a series capacitance.
Figure 6:
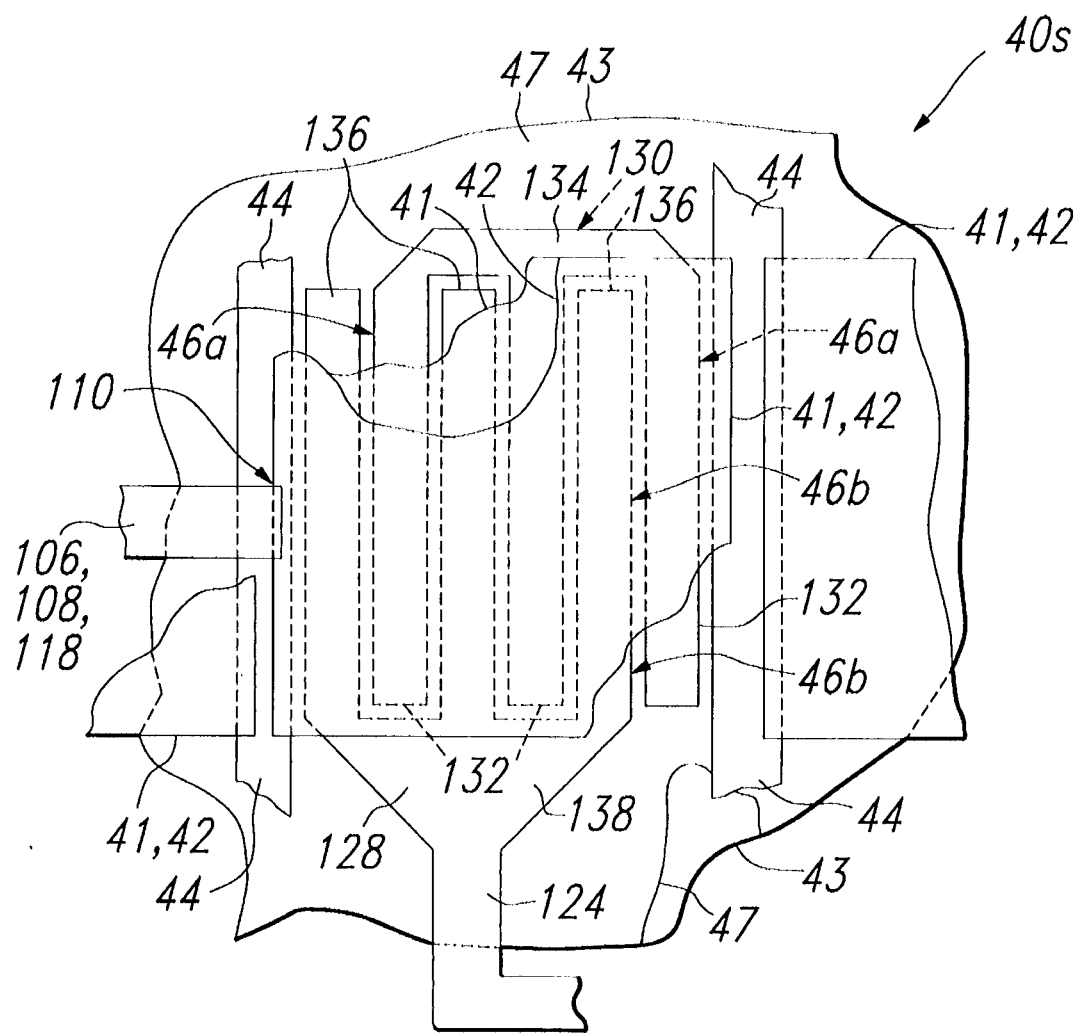
FIG. 6 is a generalized top view of a portion of a membrane type of variable capacitor, similar to that shown at the left in FIG. 2, and in FIGS. 4, and 7–9, and 18–25 which includes structure, to operate as a series variable capacitor according to the principles of the present invention as described with reference to FIG. 4.
Figure 7:
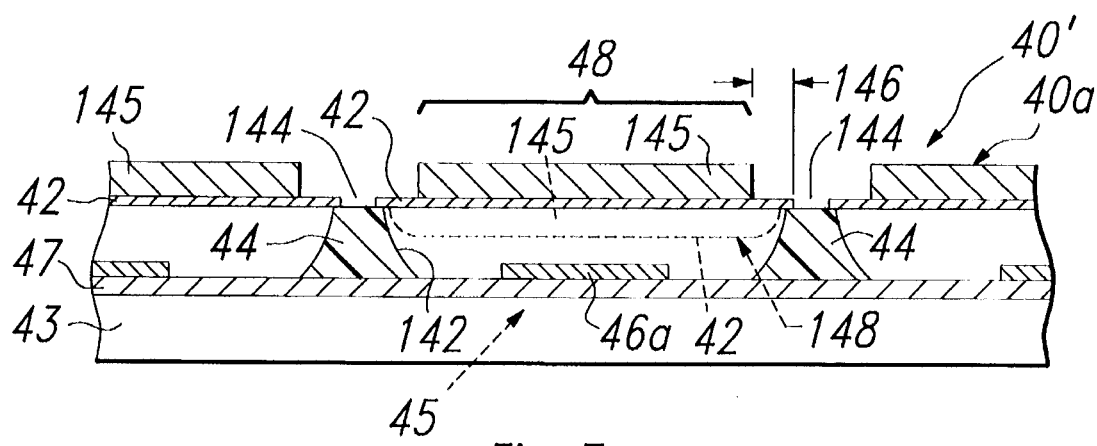
FIG. 7 is a generalized, sectioned side view of a membrane type of variable capacitor, taken generally along line 7—7 in FIG. 8, which is similar to those shown in FIGS. 2–4, 6, 9 and 18–25, which utilizes spacers similar to those shown in FIGS. 2–4 rather the posts shown in FIGS. 9 and 18, the capacitor including facilities for ensuring that a significant portion of the capacitor remains planar rather than deforming curvelinearly as in FIGS. 2–4, 6, 20 and 25(b)
Figure 8:
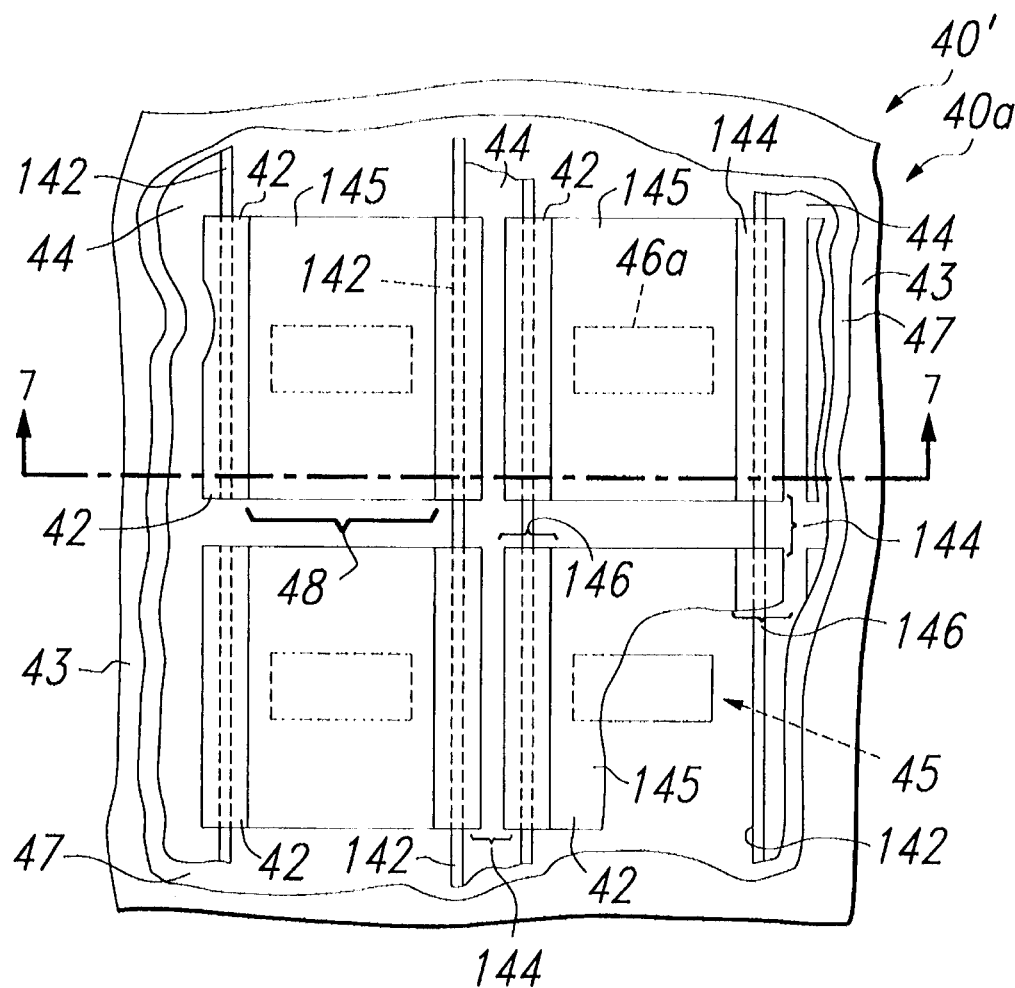
FIG. 8 is a generalized top view of the membrane type of variable capacitor depicted in FIG. 7, portions of the capacitor being broken away to better illustrate the constituent elements thereof.
Figure 16:
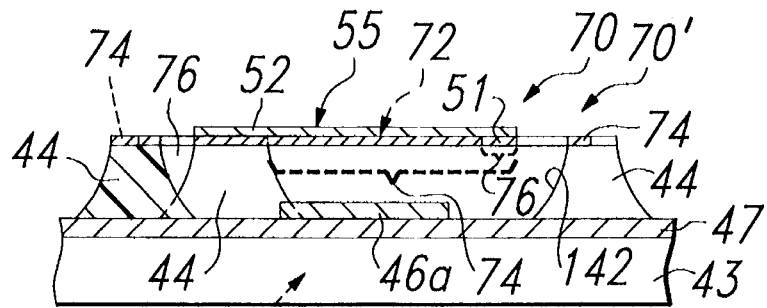
FIGS. 16 and 17 are generalized, sectioned side views of a flexure-beam type of DMD SLM, taken generally along line 16,17—16,17 in FIG. 15, which respectively depict a variable capacitor according to the present invention and having a member in a normal position (FIG. 16) and the member in a position resulting from its attraction toward a control electrode (FIG. 17)
Figure 17:
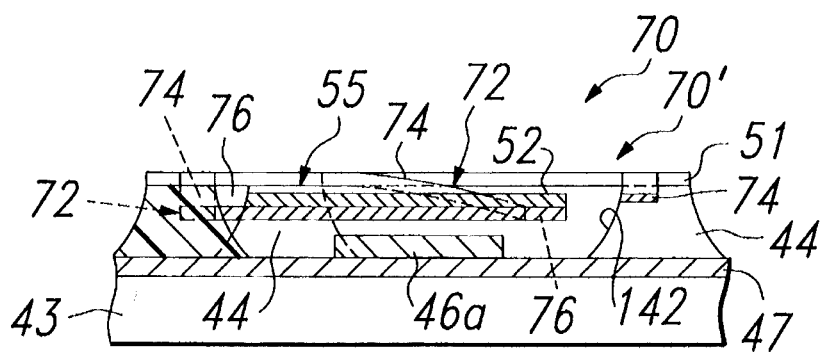
Figure 19:
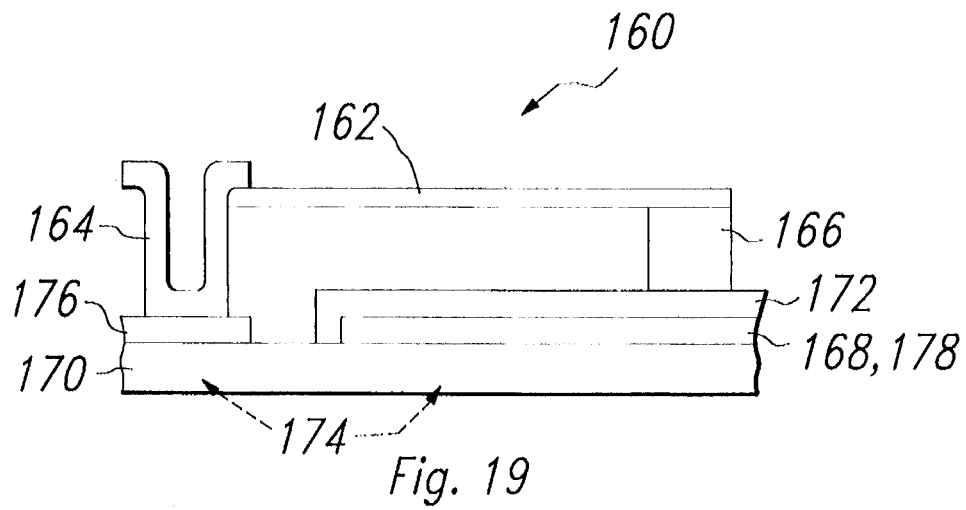
FIG. 19 is a side, sectioned view of a membrane type of DMD SLM used as a variable capacitor and utilizing both a conductive post (of the type shown in FIG. 9) and an insulative spacer (of the type shown in FIG. 7) to support the membrane.

The present invention relates to microminiature, monolithic devices 40, 50, 60, 70, 80 and 160 of the types shown respectively in FIGS. 2–4 and 6–9; FIGS. 10–13; FIG. 14; FIGS. 15–17; FIG. 8 and FIG. 19. The devices 40, 50, 60 and 70 are variable electrical capacitors; the device 80 is an electrical or optical switch. The devices 40, 50, 60, 70 and 80 are constituted of elemental DMD SLM's 40', 50', 60', 70' and 80' modified or utilized as described below, and electrically operated in a variety of ways, for example, as generally illustrated in FIGS. 3 and 4. The present invention also relates to utilizing the capacitors 40, 50, 60, 70, 80 and 160 in apparatus as illustrated in FIGS. 20–25.

Figure 1:
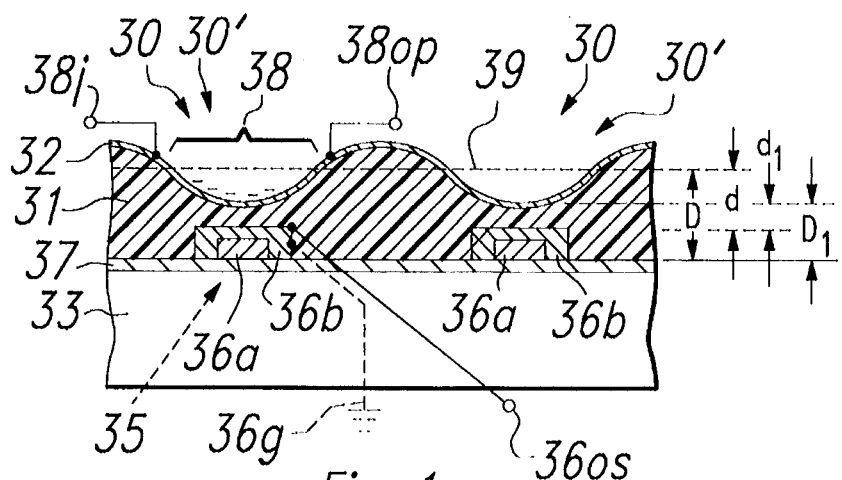
FIGS. 1, 1(a) and 1(b) are a generalized, sectioned side view of a variable electrical capacitor in accordance with the principles of the present invention, the capacitor being constituted of an elastomer type of DMD SLM.

FIGS. 2–17, are generalized depictions of a variety of elemental DMD SLM's 40', 50', 60' and 70', the structures of which serve as the basic building blocks for the variable capacitors 40, 50, 60 and 70 of the present invention. FIG. 1 depicts an elemental DMD SLM 30' of a type not as conveniently adapted to be used as a variable capacitor 30 according to the present invention, but which could be so adapted, if desired. FIG. 1 is, in any event, used as an illustration of some principles of the present invention as embodied in FIGS. 2–25.

FIG. 1 depicts an elastomer type of elemental DMD SLM 30' which includes an relatively thick elastomeric layer 31 carrying a deformable, relatively thin deposited metal layer or membrane 32. Where the DMD 30' is used as such, the metal layer 32 is highly light-reflective. The layer membrane 31 and 32 are deposited on a silicon or other suitable substrate 33 atop an addressing circuit, only generally indicated at 35, by standard hybrid integrated circuit MOS CMOS, etc. processing techniques. The circuit 35 may be formed in and/or on the substrate 33 and includes spaced control or address electrodes 36a preferably comprised of metal. As in other DMD SLM's 40', 50', 60', and 70', although the control electrodes 36a are depicted as residing on the top surface of the substrate 33, they may be "buried" or integrated in the substrate 33 as independent conductive paths or as appropriately doped regions. The elastomeric layer 31 has a normal or first thickness T which maintains the metal layer or membrane 32 a normal, first distance D away from the top of the substrate 33 and a distance d above the control electrodes 36a carried thereby (D and d being equal if the electrodes 36a are buried). Depending on the materials of the layers and membranes 31 and 32, the substrate 33 and the control electrodes 36a, as well as on the nature of the addressing circuit 35, the electrodes 36a may be insulatively spaced from the substrate 33 by an electrically insulative layer 37, which may be an oxide of the material of the substrate 33 or other oxide or insulative material.

When a control electrode 36a is energized so that it and the immediately superjacent segment 38 of the metal layer or membrane 32 have imposed thereon sufficiently large potentials of opposite polarity—whether this is achieved by the addressing circuit 35 affecting the control electrode 36a or otherwise—the electrostatic force between the segment 38 and the electrode 36a may attract (or repel) the segment 38 toward (or away from) the electrode 36a. This attraction (or repulsion) moves or curvilinearly deflects the segment 38 toward (or away from) the electrode 36a, thereby decreasing (or increasing) the thicknesses of the intervening material of the elastomeric layer 31 to D, and d, as shown in FIG. 1. Alternatively, potentials of the same polarity could be applied to both the control electrode 36a and the superjacent segment 38 to produce an electrostatic repulsion force therebetween which will increase, rather than decrease, the distances D and d.

Thus, depending on the state, energized or deenergized, of the control electrodes 36a and on the polarity of each electrodes 36a and its related segment 38, the thickness of the elastomer 31 is diminished (or increased) over the electrode 36a and is increased or diminished between adjacent electrodes 36a. When the electrodes 36a are deenergized and the layers or membranes 31 and 32 are in their normal, first positions. The first position of the metal layer or membrane 32 is denoted by a dashed line 39. When the membranes 31 and 32 are deformed by an attractive electrostatic field out of the first position 39, potential energy is stored therein. The stored potential energy tends to return the membranes 31 and 32 to their normal, first generally planar positions 39. When an energized electrode 36a is deenergized, the energy stored in segment 38 and the immediately surrounding portions of the membranes 31 and 32 to normal planarity.

The surface variations of the metal layer 32 effected by selective energization of the control electrodes 36a may be used to modulate incident light in amplitude or phase when the elemental DMD 30' is used as such.

Although impressing voltages of the same polarity on the electrodes 36a and their related segments 38 is effective to move the segments 38 out of their first positions 39 either toward or away from the control electrodes 36a, the remainder of the description will focus on impressed voltages of different polarities which effect movement of the segments 38 of the membranes 32 (or their functional counterparts) toward the electrodes 36a. Further, as will be apparent, when a voltage is impressed on one element, say a segment 38, a attractive voltage of an opposite polarity may either be (a) induced on the corresponding other element, here a control electrode 36a, or (b) directly applied or impressed via an independent agency (such as the addressing circuit 35) on the other element. The voltages—attractive or repulsive—on each segment 38 and its electrode 36a may be effected as appropriate by the addressing circuit 35.

In FIG. 1, an output electrode 36b and a respective superjacent segment 38 of the metal layer 32 may be viewed as the plates of a variable, parallel plate capacitor 30. Specifically, the segment 38 is the movable plate or member and the electrode 36b is the stationary plate. The electrode 36b may be adjacent to its corresponding control electrode 36a on the substrate 33, as shown in FIG. 1, wherein the electrode 36b is behind the electrode 36a into the plane of the Figure. The dielectric between the relatively movable capacitor plates 36b and 38 is the elastomer 31. Alternatively, the function of the electrode 36b may be performed by the substrate 33, if it is sufficiently conductive, or by a conductive region formed therein when the substrate 33 is not sufficiently conductive. As described below, the electrode 36b may be absent and the control electrode 35a may assume its function. Since the distance between the capacitor plates 36b, 38 is adjustable, the capacitor 30 is variable. The foregoing assumes that electrical control signals applied to the control electrodes 36a and the segments 38 of the metal membrane 32 for adjusting the capacitance of the capacitor 30 may be applied independently of and without affecting any input electrical signal which is intended to be affected only by the capacitor 30 (i.e., the capacitor 36b, 38) and vice versa. Techniques for applying these signals to the variable capacitors 40, 50, 60 and 70 in this manner are described below. Suffice it here to note that if each segment 38 of the metal membrane 32 is to function as the movable plate of a variable parallel plate capacitor independently of its neighboring variable capacitors 30, adjacent segments 38 should be electrically isolated, for example by rendering the metal layer 32 discontinuous in regions thereof superjacent to the spaces between each pair of electrodes 36a and 36b. If the electrode pairs 36a, 36b reside in an array thereof, a corresponding array of variable capacitors 30 may be formed by a grid of discontinuities (not shown) in the metal layer 32. It should be further noted that the individual segments 38 of the metal layer 32 of the array of variable capacitors 30, may be viewed in a macro sense to, represent a "surface" having distributed variable capacitance as described later, this "surface" may constitute a portion of the surface of a variety of apparatus, such as a transmission line, a coupler, an antenna, a FIN line or a waveguide.

Thus, FIG. 1 illustrates the elemental DMD SLM 30' formerly used to modulate light functioning as a variable capacitor 30 and, as it were, as a device having a member (the segment 38) which is relatively movable with respect to a stationary member (the electrodes 36 and/or the substrate 33).

Figure 1A:
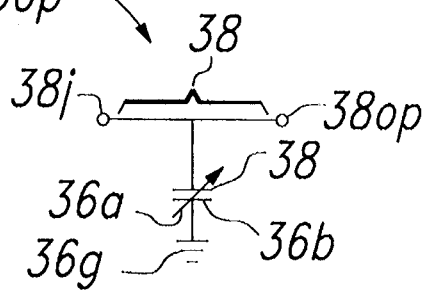

Continuing to refer to FIG. 1, as the electrical control signals are applied to the control electrodes 36a and the segment 38, the segment or movable capacitor plate 38 at the left and its output electrode or stationary capacitor plate 36b form a capacitor 30 independent of other adjacent capacitors 30. An input signal may be applied to the segment 38 by an input conductor 38i which is electrically continuous with one extremity of the segment 38. If the capacitor 30 (or 36b, 38) is to affect the input signal on the conductor 38i by being in parallel therewith, an output conductor $38_{OP}$ electrically continuous with another opposed extremity of the segment 38 may be provided. The input signal will be affected by the capacitor 30 (or 36b, 38) as it traverses the segment 38 in a manner determined by the capacitance of the capacitor 30, which is determined by the distance between the segment 38 and the electrode 36b (and ultimately by the polarities of and the difference between the voltages on the segment 38 and the control electrode 36a). This function of the capacitor 30, which is illustrated schematically in FIG. 1(a), may require grounding the electrode 36b as shown at 36g. The function of the electrode 36b may be performed by the substrate 33 or by a conductive region formed in the substrate 33, which may, if necessary, be grounded.

Figure 1B:
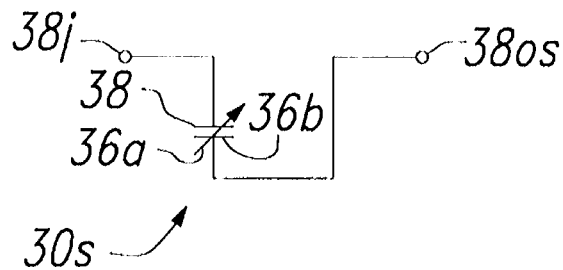

If the capacitor 30 (36b, 38) is to serially affect an input signal on conductor 38i, an output conductor $36_{OS}$ electrically continuous with electrode 36b is provided (the conductor $38_{OP}$ and the ground 36g may be eliminated). This function of the capacitor 30 is illustrated schematically in FIG. 1(b).

FIG. 2 illustrates adjacent elemental DMD's 40' of the membrane type each used as a variable capacitance 40. One possible type of DMD 40'—which is somewhat inconvenient to manufacture by MOS, CMOS and other techniques—is shown at the right and comprises a variant of FIG. 1, possessing a thin polymer membrane 41 covered with a thin deformable membrane layer of metal 42. In a more preferred form, the DMD 40' includes only a thin, deformable, self-supporting, thin metal layer or membrane 42 as shown at the left in FIG. 2; the polymer membrane 41 is eliminated. The metal layer or membrane 42 (and the polymer membrane 41, if present) is supported above a substrate 43, similar to the substrate 33, by spacers 44. In typical DMD's 40' of this type, the spacers 44 lie on an orthogonal grid. An addressing circuit, generally shown at 45 and including a control electrode 46a, underlies the metal membrane 42 within each area defined by the grid of spacers 44. The addressing circuits 45 and their electrodes 46a may be similar to their counterparts 35 and 36a in FIG. 1. To avoid clutter, output electrodes 46b physically similar to the electrodes 36b are not shown. Where required, the electrodes 46a, 46b may be electrically insulative from the substrate 43 by an insulative layer 47, similar to the layer 37 in FIG. 1. The segment 48 of each metal layer 42 directly superjacent to its electrodes 46a and 46b may be attracted toward (or repulsed away from) such electrodes 46a and 46b by application of an appropriate potential difference between the segment 48 and the electrode 46a. This attraction (or repulsion) curvilinearly moves or deflects the segment 48 by simultaneously deforming the metal membrane 42 out of its first position or normal planar configuration, indicated by the broken line 49.

As with the elemental DMD 30', the elemental DMD 40' may be viewed, and used, as a variable capacitor 40. The dielectric between the stationary plate—the electrode 46b—and the movable plate—the metal membrane 42—may be air or another expedient medium, rather than the elastomer 31. As with the capacitor 30, if the individual segments 48 of the metal membrane 42 are to function as independent movable plates of independent variable capacitors 40, the segments 48 should be electrically isolated from each other as by forming a pattern of discontinuities (not shown) in the metal layer 42 congruently with the pattern of spacers 44.

As noted earlier, in some prior elemental DMD's 40', the spacers 44 are in a grid so that energization of a control electrode 46a results in configuring the corresponding segment 48 of the membrane 42 in a spherical or other curvilinear manner. Achieving this curvilinear configuration is not necessary if the segments 48 are to act as the movable or deflectable plates of air-gap, variable capacitors 40. Indeed, producing the curvilinear configuration may render analysis of the capacitance of the resulting capacitor 40 (46b,48) rather difficult and, more importantly, may require that the potential difference across each segment 48 and its corresponding control electrode 46a be unreasonably high. As discussed in more detail below, each capacitor 40 preferably utilizes a pair of parallel spacers 44 and not a box-like grid thereof. In this way, each segment 48 of the membrane 42 is supported only at two diametrically opposite sides thereof, not completely around the periphery of the segment 48. As a consequence, lower voltages are required to achieve a given deflection of the segments 48 of the membrane 42 and, hence, a given capacitance value. Discontinuities in the membrane 42 to render the individual capacitors 40 independent of each other may be congruent with the spacers 44.

Figure 5:
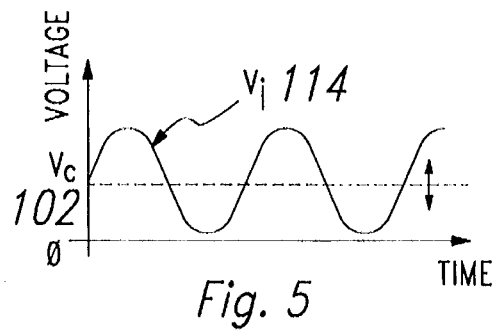
FIG. 5 is a graph of a control signal and an input signal versus time which are applied to the variable capacitors of FIGS. 3 and 4.

Turning now to FIGS. 3–5, the operation of the elemental DMD 40' of the left portion of FIG. 2 used as a variable capacitor 40 is described. As will be seen, the principles illustrated by these Figures are applicable to the other elemental DMD's. The following description assumes that membrane 42 is electrically independent of its neighboring membranes 42 in the array of elemental DMD's 40' so that each capacitor 40 is electrically independent of its neighboring capacitors 40 in the capacitor array. Whether such independence is achieved by forming the aforenoted discontinuities (not shown) in the metal layer 42 or otherwise—as by appropriate energization of the electrodes 46 or by electrical isolation techniques—is unimportant to the present invention.

In FIG. 3, the normal position of the membrane 42 is depicted, while the position thereof during attraction or deflection toward the electrode 46a is shown by a broken line 100. (The line 100 would be bowed upwardly if the membrane 42 were repulsed away from the control electrode 46a and the output electrode 46b). FIG. 3 illustrates the capacitor 40 in a parallel or shunt connection (see also FIG. 1(a)), and the reference numeral 40P is used to designate the capacitor 40 connected in this manner. As explained below, the insulative layer 47 of FIG. 2 may not be needed in the embodiment of FIG. 3. Specifically, as will be seen, the stationary plate of the capacitor 40P—here, either the substrate 43 or the electrode 46b resident on such substrate 43—is grounded, as shown at 101, so that there is a capacitance-to-ground between it and the movable or deflectable membrane 42 of the capacitor 40P. A variable control signal 102 is applied by a control signal source 104 to the membrane 42, as indicated by the path 106 between the source 104 and an input 108 which is schematically shown as connected to the layer 42 at 110. The source 104 may also be connected to ground at 112.

The variable control signal 102 may be a "low frequency" voltage, $V_c$, which may be a DC voltage, the magnitude and/or duty cycle of which is variable. As used herein, a "low frequency" voltage means a voltage having a frequency which, with respect to the resonant frequency of the movable portion of the membrane 42 supported between the spacers 44, i.e., the segment 48 is sufficiently low so that the membrane 42 of a capacitor 40P to which the control signal 102 is applied, is able to nearly instantaneously move or deflect substantially in synchronism therewith. If the signal 102 is dc, (frequency=0) the membrane 42 remains stationary and the variable capacitor 40P is constant. If the control signal 102 is time-varying and, the membrane 42 moves in synchronism therewith, the capacitor 40P is variable time.

Specifically, when a control voltage 102 is applied between the membrane 42 and either the underlying portion of the substrate 43 (acting as a control electrode) or the control electrode 46a, an electrostatic field is produced in the space between the membrane 42 and the substrate 43 or the electrode 46a. If the control signal 102 is a DC voltage as shown in FIG. 5, the resultant electrostatic field is non-time-varying, resulting in the membrane 42 being moved or deflected toward (or away from) the substrate 43 or the electrode 46a out of its normal, first position as a function of the magnitude of the voltage. Such movement or deflection decreases (or increases) the distance between the membrane 42 and the substrate 43 or the electrode 46a. Since the capacitance of a parallel plate capacitor is inversely proportional to the distance between the plates 42, 43 or 42,46a thereof, this decrease (or increase) in distance increases (or decreases) the capacitance of the capacitor 40P. Removal of the control signal 102 permits the mechanical energy stored in the membrane 42 (as a result of its deformation and deflection) to return the membrane 42 to the normal, planar position, which represents the minimum (or maximum) capacitance of the capacitor 40P, since the separation between the plates 42 and 43, or 42 and 46a thereof is at its maximum (or minimum). Thus, the capacitance of the capacitor 40P is a function of the control signal 102. If the polarity of the voltages on the membrane 42 and on the substrate 43 or on the electrode 46a is the same, an increasing voltage difference moves the membrane 42 out of its maximum capacitance position to one whereat the capacitor 40P has a lower capacitance.

In view of the resonant-frequency-determining and other mechanical characteristics of the membrane 42—characteristics such as, without limitation, the size, areal configuration and mass of the membrane 42; the ductility and thickness of the membrane 42; the thickness and the elastic modulus and/or spring constant of the membrane 42, and the manner and amount of membrane 42 support—there is a range of frequencies beginning with zero (0 frequency being DC) which will permit the membrane 42 to move or deflect substantially in synchronism therewith. The foregoing is generally true for a low frequency voltage having practically any waveform. Those skilled in the art will be able to easily determine what constitutes a "low frequency" control voltage 102 for a given membrane 42. In preferred embodiments, the control signal 102 is either a dc voltage the amplitude of which is selectively variable or a dc voltage with a constant amplitude, the duty cycle ("on/off time ") of which is selectively variable. These types of control signals 102 result in the capacitor 40P effectively functioning as a variable, linear capacitor. If the control voltage 102 is time varying at frequency sufficiently low to permit the membrane 42 to deflect and "undeflect" in synchronism therewith, the capacitor 40P effectively functions as a variable capacitor.

The variable capacitor 40P is intended to affect an input signal 114. The input signal 114, which is a time-varying voltage, preferably has, relative to the control signal 102, a "high frequency." For purposes hereof, a "high frequency" input signal 114 means a signal having a frequency so high that, considering the resonant-frequency-determining mechanical and other characteristics of the membrane 42, as described above, the membrane 42 cannot move or deflect in response thereto in any significant manner. That is, in simplistic terms, the mechanical inertia of the membrane 42 is too high, and the changes in the input signal 114 with time are too rapid for the membrane 42 to respond thereto. In essence, the membrane 42 cannot "see" the high frequency input signal 114.

The input signal 114, preferably in the form of a high frequency voltage, V, as discussed above, is applied to the input 108 and to the membrane 42 from a source 116 via a path 118. An output 120 is connected to the membrane 42 at 122. The source 116 is grounded at 112. In effect, the control signal 102 and the input signal 114 may be superimposed at the input 108 and simultaneously applied to the membrane 42, as shown in FIG. 5.

Assuming that the output 120 is applied to and utilized by a utilization circuit (not shown) or otherwise, the low frequency control voltage 102 adjusts the distance between the segment 48 of the membrane 42 and the substrate 43 or the output electrode 46b thereby adjusting the capacitance-to-ground of the capacitor 40P the plates of which are the membrane 42 (movable plate) and the substrate 43 or the electrode 46b (stationary plate). The adjusted capacitance-to-ground affects the impedance of the path 118-108-42-120 and, accordingly, the input signal 114. The input signal 114 has no effect on the deflection of the membrane 42 and, accordingly, has no effect on the capacitance of the capacitor 40P, as explained previously. The superimposed signal may be detected, demodulated or filtered, as necessary, following the output 120 to eliminate therefrom components representing the low frequency control signal 102.

The magnitude or the duty cycle of the control signal 102 may be selectively varied to selectively alter the capacitance of the capacitor 40P and the impedance of the input 108. These variations may be "manual" or "automatic." Automatic variation may be effected by varying the control voltage 102 in response to feedback which may be related to the value of the signal on the output 120 or to a signal derived from elsewhere, for example, from a utilization circuit connected to the output 120. Thus, feedback from the output 122 or from the utilization circuit may automatically effect adjustment of the capacitor 40P to achieve and maintain (or to affect in a selected manner) signals at the output 122 or in the utilization circuit. Manual and automatic adjustment of the control signal 102 are indicated by the reference numeral 123 appended to the control arrow of the signal source 104.

Variation in the capacitance of the capacitor 40P in FIG. 3 may be achieved through the operation of the addressing circuit 45. For example, the addressing circuit 45 may affect the impedance of, or make or break, the path to ground 101 of the substrate 43 or the electrode 46b, thereby affecting the amount of deflection achieved by the membrane 42 for a given control voltage $V_c$. Affecting the impedance of the path to ground 101 may involve the addressing circuit 45 adding or subtracting impedance or electrical signals to the path as those skilled in the art will appreciate.

In alternative embodiments, the frequency of the input signal 114 may be such that the membrane 42 moves in response thereto. This results in the capacitor 40P functioning as a non-linear capacitor, the capacitance of which, C(t) varies as the frequency of the input signal 114, V(t).

FIG. 4 depicts a series connection of a variable capacitor 40, consequently labeled 40S, in which reference numerals similar to those used in FIG. 3 are used to denote similar elements. In FIG. 4, the variable capacitor 40S of the present invention is in series with the input signal 114. In FIG. 4, an output 124 is connected to the stationary capacitor plate, i.e., the output electrode 46b (or other conductor), as shown at 128, which electrode 46b may be formed with, and in the same manner as, the electrode 46b in FIG. 3. Unlike the situation in FIG. 3—wherein the electrode 46b (if present) or the substrate 43, acting as the stationary plate of the capacitor 40P, carry current only during charging of the capacitor 40P—the stationary plate 46b of the capacitor 40S, shown as comprising the output electrode 46b, must continuously conduct current to the output 124. This current conduction requirement dictates that the output electrode 46b be insulated from the substrate 43 by the insulative layer 47. Instead of the single control electrode 46a of FIG. 3, two control electrodes 46a are shown as residing on the layer 47 in FIG. 4 for illustrative purposes. It will be understood that two or more output electrodes 46b and two or more control electrodes 46a may reside on the layer 47 and that these electrodes 46a, 46b may be interleaved, interdigitated or otherwise spatially related as necessary or desired.

The capacitance of the capacitor 40S in FIG. 4 is set by the control signal 102, preferably a low frequency voltage (as defined above) which is applied to the membrane 42 to produce an electric field between the membrane 42 and the control electrodes 46a, which are grounded at 130. The amount of deflection of the membrane 42 determines the change in the capacitance of the capacitor 40S. The input signal 114, preferably a high frequency voltage (as defined above), is affected by the capacitance but has no effect on the deflection of the membrane 42 or, consequently, on the value of the capacitor 40S. The input signal 114 is, in effect applied to a path 108-42-46b-124, the impedance of which depends on the value assumed by the capacitor 40S and the frequency of the signal 114. As with the capacitor 40P, the addressing circuit 45 may affect the control electrodes 46a or the output electrode 46b, and, in this event, appropriate connections (not shown) will be made among these elements 45, 46a and 46b. Appropriate "routing" of these connections and of the various paths 101, 106, 108, 118, 120, 124 and 130, and appropriate locations for the various connections 110, 122 and 128, as well as the methods for achieving same, may be those embodied in any suitable prior art technique relating to MOS, CMOS or other hybrid, integrated, monolithic, microminiature circuit manufacture or in modifications thereof as would be known to those skilled in the art. The same is true, of course, regarding the embodiments depicted in other Figures hereof.

A specific embodiment of the capacitor 40S generally illustrated in FIG. 4, is depicted in FIG. 6, wherein there are present reference numerals which are the same as or similar to those used for related elements in FIG. 4. In FIG. 6, the electrodes 46a comprise a plurality of conductive fingers 132 connected to or formed integrally with a bus member 134. The bus member 134 is, in turn, connected to the ground 130 at a situs which is only schematically depicted. Similarly, the electrode 46b comprises a plurality of conductive fingers 136 connected to or formed integrally with a bus member 138, which assumes identicality with the connection 128. The fingers 132 and 136 may be interleaved or interdigitated as shown, with the layer 47 insulating them from the substrate 43, and gaps 140 therebetween electrically insulating the fingers 132 from the fingers 136. A single capacitor 40S of a row capacitors 40S is depicted in FIG. 6. There may be columns of the capacitors 40S, so that there is presented an orthogonal or other array of variable capacitors 40S.

Typical elemental DMD's 30', etc., used as such, may have dimensions as small as about 10–12 microns square and as large as about 25 microns square. It must be remembered that, when a DMD is used as such, extremely short response time—rapid deflection which is nearly instantaneous with the application of a control signal—is a crucial desideratum. For a given control signal, short response time is primarily dependent on the mass/inertia characteristics of the deflectable membrane 32, 42, etc., of the DMD 30', 40', etc., thus putting a premium on very small, and, hence, low mass, membranes. As noted above, however, when a DMD such as 40 is used as a capacitor such as 40P or 40S, it is necessary for the membrane 42 to be kinetically insensitive to the input signal 114. Also, the capacitance of a parallel plate capacitor varies as the area of its plates. The foregoing suggests that larger size, and/or higher mass membranes 42 than those present in an elemental DMD 40' are desirable in variable capacitors 40P and 40S. Indeed, it appears that membranes 42 in variable capacitors of the type involved herein should be on the order of about 5 mm square, or about 40,000 to 250,000 larger in area than the deflectable members of DMD's used as such. This increase in area brings about, of course, a concomitant increase in mass/interia.

FIGS. 7 and 8 represent a variant 40a of the variable capacitor 40 shown in FIG. 2–4. In this modification 40a, the spacers 44 have a cross-sectional contour representative of that achieved when a well or volume 142, into which each segment 48 of the membrane 42 deforms, is formed by a procedure such as isotropic plasma etching in oxygen containing a few percent fluorine. Moreover, for illustrative purposes, discontinuities 144 have been formed in the membrane 42 between the segments 48 with diametrically opposed edges of the segments 48 being supported on opposed spacers 44. In FIG. 7, each membrane 42 segment 48 carries a relatively thicker, essentially integral member 145 which may result from deposition or formation of metal on the metal membrane 42 according to MOS, CMOS or equivalent techniques. The member 145 contributes significant mass to the deformable system 42-145 and has a low compliance as compared with the margin 146 of the membrane 42. The membrane 42, the member 145, the spacers 44 and other elements described above may be formed in a manner similar to or the same as that employed to produce DMD SLM's. This formation may include alternating and/or repetitive sputter deposition of metals (such as aluminum or aluminum alloy), plasma etching, plasma deposition of oxides and other steps as described in Section 4 of the above-noted article by Hornbeck and in commonly assigned U.S. Pat. No. 5,061,049.

As a consequence of the presence of the member 145, which effectively defines the segment 48, attraction or deflection of the membrane 42 segment 48 and its integral member 145 toward the control electrode 46a permits the segment 48 to remain essentially flat, with deformation being confined to the margin 146 of the membrane 42 which surrounds the segment 48 and the member 145 and which supports them at two diametric sides. The foregoing support scheme—support only at two diametric sides of each segment 48 of the membrane 42—is shown in greater detail in FIG. 8. This type of support results in non-curvilinear deformation of the membrane 42 which involves only opposed portions of the margin 146 of the membrane 42 and not the segment 48 or the member 145. Such deformation is represented by the broken line 148 in FIG. 7. Obviously, the multiple electrode 46a,46b structure schematically shown in FIG. 4 may be implemented in the embodiments of FIGS. 7 and 8, if desired, although the electrode 46b is not visible in FIGS. 7 and 8. In FIGS. 7 & 8 the stationary plate of the capacitor 40a may, as in other Figures, comprise the substrate 43, or the output electrode 46b. The capacitor 40a may be parallely or serially related to the input signal 114 as in FIGS. 3 and 4, respectively.

Figure 9:
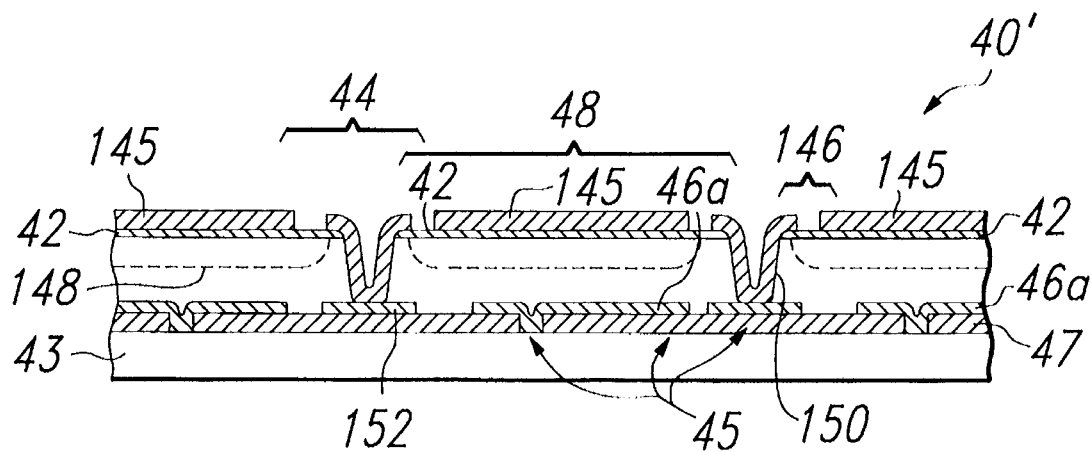
FIG. 9 includes generalized, sectioned side view a membrane type of DMD SLM used a variable capacitors in a manner similar to the use of the DMD SLM's depicted in FIGS. 2 and 7, the membrane thereof being supported by posts rather than the spacers of FIGS. 2 and 7, the deformed membrane being maintained planar by appropriate facilities.

FIG. 9 illustrates an alternative variable capacitor 40 based on elemental DMD's 40' of the membrane type similar to those shown in FIGS. 7 and 8. In the presentation of FIG. 9, the photoresist spacers 44 are replaced by metallic support posts 150, which may be produced by the so-called "buried hinge" methods disclosed in the aforenoted '049 patent and the article by Hornbeck and comprising MOS,CMOS or other procedures which include repetitive/alternating metal sputtering, plasma oxide formation, plasma etching and other known steps. The posts 150 function much as the input 108 and the connection 110 to the membrane 42 in FIGS. 3 and 4.

Portions of the addressing circuit 45, such as an electrode 152 and the control electrode 46a are shown in FIG. 9 as residing on the oxide 47 deposited on the substrate 43. Both the electrode 152 and the control electrode 46a, as well as the electrode 46b (which, if present, is not visible in FIG. 9), which may act as the stationary plate of the variable capacitor 40, might preferably be recessed beneath the upper surface of the substrate 43 and/or comprise an approximately doped region thereof. The electrode functions much as the path 118 in FIGS. 3 and 4. The electrode 152 which is electrically continuous with the membrane 42 and its member 145, may be used to impress on the membrane 42 and the member 145 of each capacitor 40 a voltage which, in conjunction with the voltage, ground or otherwise on the control electrode 46a (or on the substrate 43, if the electrode 46a is not present) contributes to the control the amount of deflection experienced by the membrane 42 and the member 145 of the capacitor 40. To this end, the voltage may be applied to the membrane 42 by the support post 150, which is in contact with the electrode 152. Each membrane 42 is diametrically supported by two post 150. As in FIGS. 7 & 8, due to the presence of the highly compliant margins 146 and the low compliance centrally located members 145, piston-like deformation of the membrane 42 occurs as the members 145 remain generally parallel to the plane of the substrate 43. Such deformation is represented by the broken lines 148.

As will be appreciated, the electrodes 46a and 152 are controlled, energized and deenergized by the addressing circuit 45. If the electrode 46b is absent, the capacitor 40 of FIG. 9 is usable as depicted in FIG. 3. If the electrode 46b is present, the capacitor 40 of FIG. 9 is usable as in FIG. 4.

Figure 10:
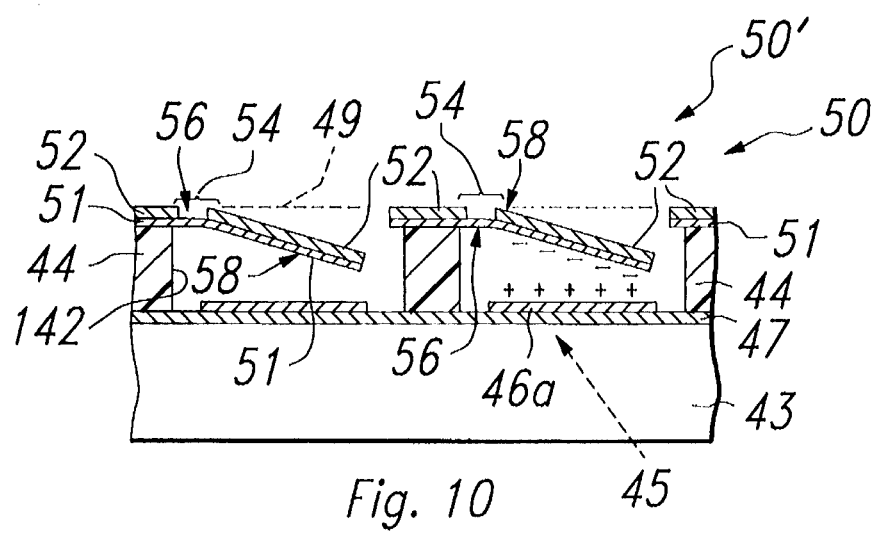
FIG. 10 is a generalized, sectioned side view of a cantilever-beam type of DMD SLM which is used as a variable electrical capacitor.

FIG. 10 depicts a generalized elemental DMD SLM 50' of the cantilever-beam type used as a variable capacitor 50. Elements which are similar to those shown in other Figures bear the same or similar reference numerals.

The member or segment 58 in FIG. 10 comprises a highly compliant portion of a relatively thin underlying metal stratum 51 on which is deposited a relatively thick, mask-patterned metal stratum 52 which has a low compliance member 58. In the DMD 50' the thick stratum 52 is absent at selected sites, as shown at 54, leaving only the thin stratum 51 to act as a cantilever beam 56. In the DMD 50' the remaining portion of the thick stratum 52 which remains, i.e., the member 58, functions as a light-reflective pixel or mirror, the rigid, low compliance nature of which confines cantilever bending to the beam 56. In the capacitor 50, the member 58, including the underlying thin stratum 51, acts as the movable plate of the variable, air-gap capacitor 50.

The length, width, thickness and material of the beam 56 and the size and mass of the member 58, inter alia, may all be adjusted to effect a desired amount of deflection of the member 58 in response to an electrical field between the member 58 and the control electrode 46a. These same parameters may also be adjusted so that the member 58 deflects in response to, an in synchronism with, the low frequency control signal 102 but not to the high frequency input signal 114. Although the beams 56 and the movable capacitor plate or members 58 are shown in FIG. 10 as supported by insulative spacers 44 having rectangular cross-sections, spacers of the type shown in FIG. 7 may be used, see FIG. 12, as may support posts 150 as shown in FIG. 9, see FIG. 11. As in other Figures, the output electrode 46b which serves as a stationary capacitor plate may or may not be present. Moreover, the capacitors 50 of FIGS. 10-12 may be operated in the same manner as shown in FIGS. 3 and 4.

Figure 12:
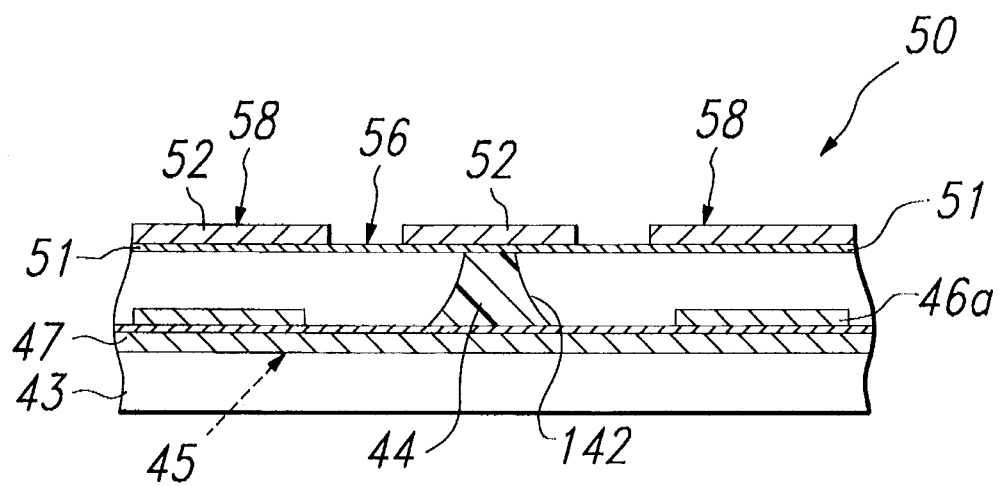
FIG. 12 is a generalized, sectioned side view of a cantilever-beam type of variable capacitor similar to those shown in FIGS. 10 and 11 which utilizes insulative spacers similar to those shown in FIG. 7 rather than the posts shown in FIGS. 3 and 4.
Figures 13A, 13B:
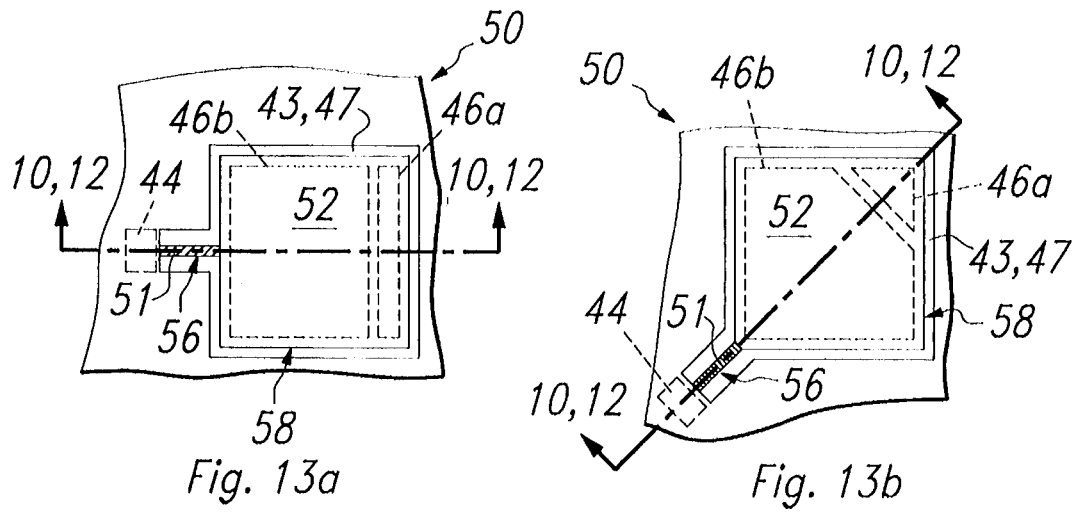
FIGS. 13(a)–13(b) include generalized top views of two different cantilever-beam types of DMD SLM's used as variable capacitors, the views of FIGS. 10 and 12 being taken generally along line 10,12—10,12 in FIG. 13.

As viewed from the top in FIGS. 13(a) and (b), the capacitors 50 of FIGS. 10 or 12 are depicted as having both the control electrode 46a and the output electrode 46b. The relatively large area output electrode 46b (not visible in FIGS. 10 or 12) renders these capacitors 50 capable of achieving relatively high capacitances, which vary as the area of the plates 46b,58 thereof. Making the output electrode 46b as large as possible is, of course, a technique that can be used in all of the embodiments hereof to maximize capacitance of the voltage-variable capacitances. Since the movable capacitor plates 58 in FIG. 13 deflect asymmetrically relative to their axes of symmetry, placement of the control electrode 46a and the output electrode 46b anywhere thereunder is sufficient to effect deflection thereof and to alter the capacitance of the capacitor 50.

Figures 14A, 14B:
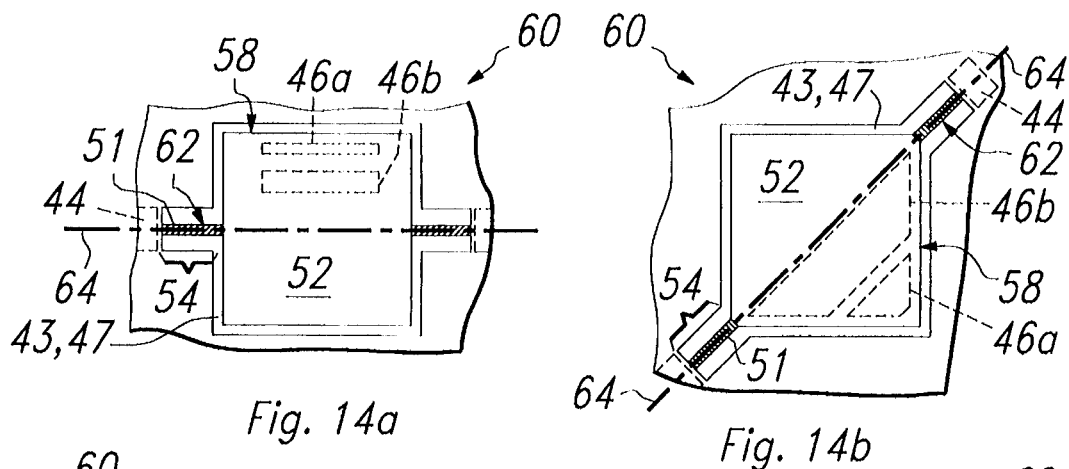
FIGS. 14(a)–14(d) include generalized top views of four different torsion-beam types of DMD SLM's used as variable capacitors.
Figures 14C, 14D:
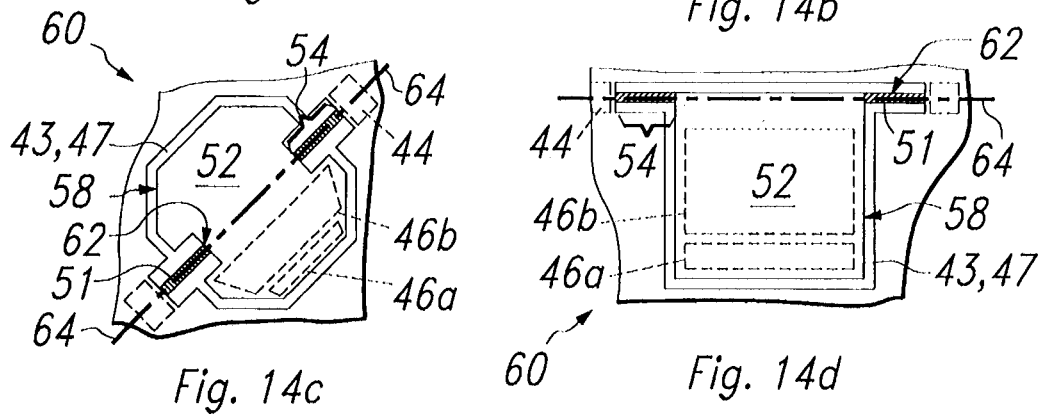
Figure 15:
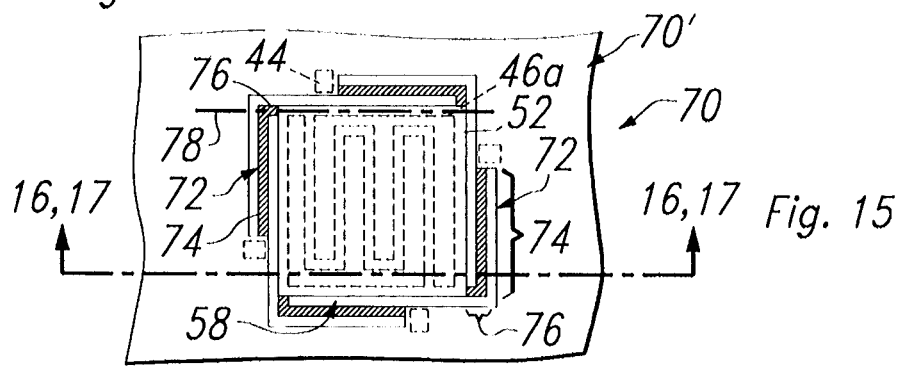
FIG. 15 is a generalized top view of a flexure-beam type of DMD SLM used as a variable capacitor, the views of FIGS. 16 and 17 being taken generally along line 16,17—16,17 in FIG. 15.

In FIG. 14 there are depicted four top views of DMD SLM's 60 of the torsion-beam type (none being shown in side elevation). The torsion beam capacitors 60 may be similar to the cantilever beam capacitors 50 of FIG. 13. In FIGS. 14(a)–(c) torsion beams 62 are formed in a manner similar to that in which the cantilever beams 56 of FIGS. 10–13 are formed. The torsion beams 62 support the movable members 58 symmetrically about and relative to an axis rotation 64 of the members 58. As a consequence, (1) the output electrode 46b has a smaller area, relative to the area of the member 58, as compared to the output electrodes 46b of FIG. 13, and (2) the control electrode 46a and the output electrode 46b must be asymmetrically located relative to the torsion beams 62 and the axis of rotation 64. The first consequence follows from the fact that equal areas of control electrode 46a on either side of the axis 64 would render the control electrode 46a incapable of deflecting the member 58, since equal forces would be applied to the member 58 on both sides of the axis 64. The second consequence follows from the fact that, upon deflection of the member 58 about the axis 64, with a symmetrically located output electrode 46b one-half of the capacitor 50 would experience a capacitance increase, while the other half would experience an equal capacitance decrease, the net of the capacitance changes being zero. It should be noted the FIG. 14 (and 13, as well) depict the beams 62 (and 56) as supported by spacers 44. These spacer 44 may, of course, be replaced by the posts 150 of FIGS. 9 and 11.

In FIG. 14(d) the torsion beam 62 and the axis 64 are asymmetric relative to the member 58, and practically any placement of the electrodes 46a and 46b is effective to yield an operable, variable capacitor 60. Thus, the capacitor 60 of FIG. 14(d) is a close functional analog of the cantilever beam capacitors 50 of FIGS. 10–13.

An analysis of capacitance variations during different amounts of deflection in the capacitors 30,40 (except for the capacitors 40 of FIGS. 7–9), 50 and 60 is somewhat complicated. This is due to the non-linear, curved shape changes which occur in the membranes 42 of the capacitors 40 and the presentation of decreasing effective area by the members 58 of the capacitors 50 and 60 in FIGS. 10–14. The deflection exhibited by the capacitors 30 of FIGS. 7–9—described above as piston-like—results in their members 58 remaining both flat and substantially parallel to its stationary plate (the substrate 43 or the output electrode 46b), which renders analysis less complicated. This virtue is shared by the capacitor 70 of FIGS. 15–17.

In FIGS. 15–17, the capacitor 70 has a movable member 58 similar to those shown in FIGS. 10–13. The member 58 is supported by beams 72 which are combined cantilever beams and torsion beams. Specifically, a cantilever section 74 is supported at one end by a spacer 44 (or support post 150) and is continuous at its other end with one end of a torsion section 76. The other end of the torsion section 76 is continuous with the member 58, specifically with the thin stratum 51 thereof. The thickness, material, length and width of the sections 74 and 76 is selected so that the modes of deformation of the sections 74 and 76 are, both cantilever and torsional. Attraction of the member 58 toward the control electrode 46a effects piston-like deflection of the member 58 as the cantilever sections 74 bend downwardly and the torsion sections 76 twist slightly about axes 78, which are generally normal to the associated side of the plate 58 and the associated cantilever section 74. The foregoing deformations of the sections 74, 76 effect a slight rotation of the member 58 in the plane of FIG. 15, which rotation has a negligible effect on the capacitance between the member 58 and any underlying output electrode 46b. In FIG. 15, the electrodes 46a and 46b are configured along the lines of their counterparts in FIG. 6; in FIGS. 16 and 17 the electrodes 46a and 46b are not digitated and the electrode 46b is not visible (if it is present).

Figure 18A:
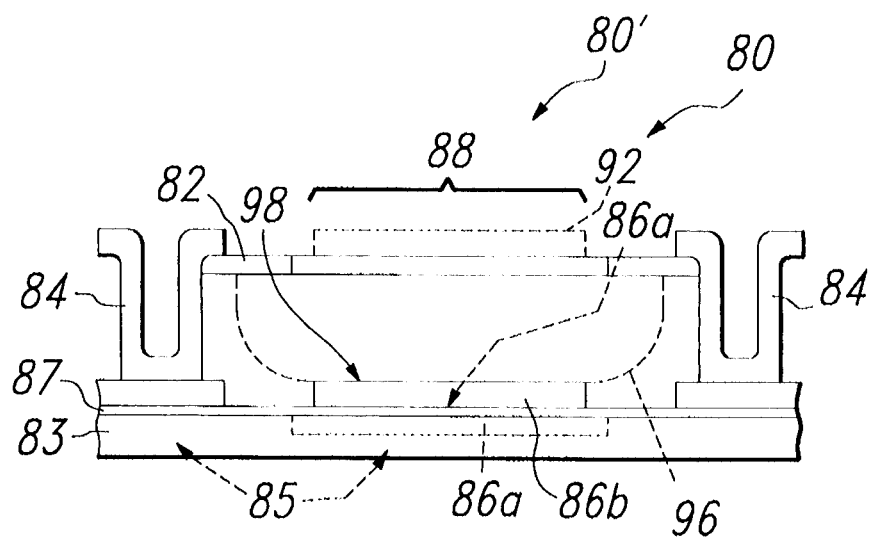
FIGS. 18(a) and 18(b) are, respectively, a side, sectioned elevation and a plan view of a membrane-type of DMD SLM used as a switch for a transmission line.
Figure 18B:
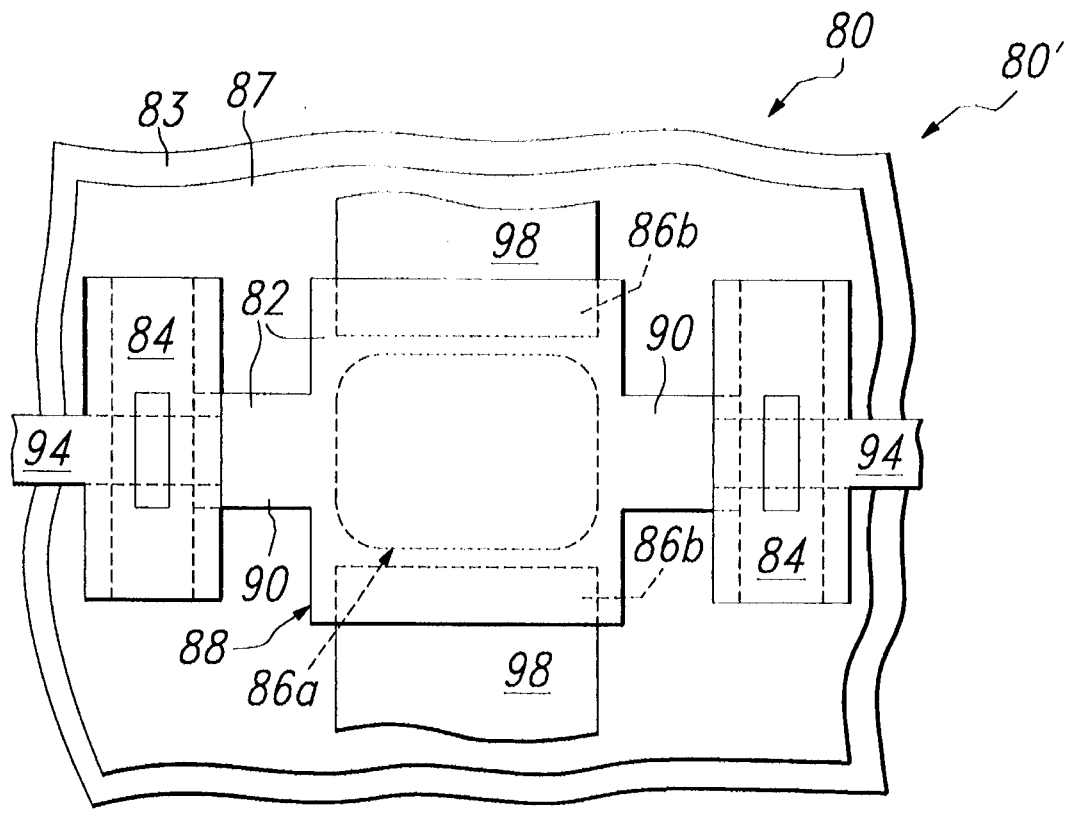

Turning now to FIG. 18, there is shown a device 80 based on an elemental DMD-like SLM 80'. The device 80 is a switch, rather than a capacitor, as shown in earlier Figures. The switch 80 includes a thin, high compliance metal membrane 82 supported above a substrate 83 by, and electrically continuous with, metal posts 84 similar to the posts 150 in FIGS. 9 and 11. Formed in and/or on the substrate 83 is an addressing circuit 85. An appropriately constituted portion of the substrate 86a serves as a control electrode which is selectively energized by the addressing circuit 85. A separate control electrode 86a, similar to the electrode 46a in earlier Figures may, if necessary, be employed. Two separated output electrodes 86b reside on a dielectric layer 87 formed on the substrate 83. A deflectable member 88 constitutes a central portion of the membrane.

The deflectable member 88 is supported by the posts 84 via narrower margins 90 formed by selective removal of the membrane 82. The margins 90 are, because of their narrowness, more compliant than the member 88. If it is necessary to render the member 88 even less compliant, and/or if it is desired that the configuration of the member 88 be planar, or nearly so, during deflection, the member 88 may be made thicker than the margins 90. For example, a thick metal layer 92 (shown in phantom in FIG. 18a) may be positioned on the member 88, as by MOS, CMOS or other deposition steps. The thick metal layer 92 serves the same function as the member 145 in Figure in FIG. 9. If the layer 92 is not present, the membrane 82 will tend to deform curvilineraly similarly to the membranes in FIGS. 2–4 and 6, although this tendency is ameliorated to some extent by the width of the member 88 being greater than the width of the margins 90. The presence of the layer 92 and/or the difference in width of the member 88 and the margins 90 will result in piston-like or quasi-piston-like deformation of the type depicted in FIGS. 7 and 9.

Figure 11:
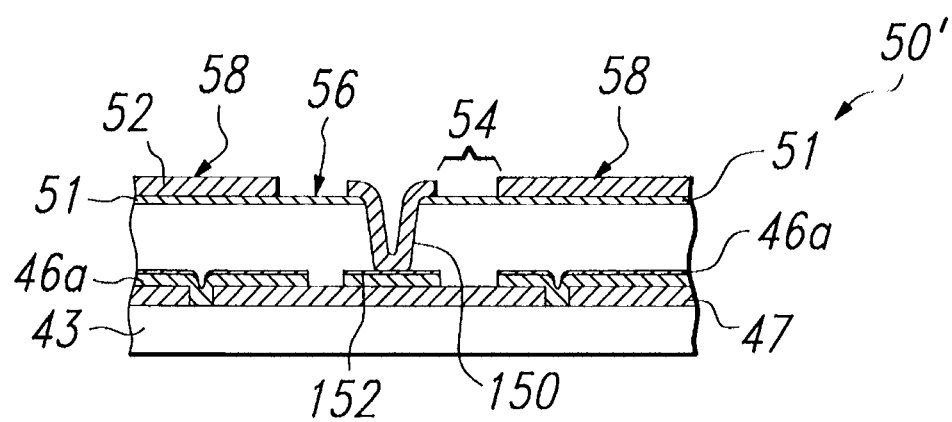
FIG. 11 is a generalized, sectioned side view of a cantilever-beam type of DMD SLM used as a variable capacitor in a manner similar to the use of the DMD SLM depicted in FIG. 10, the beams and the hinges thereof being supported by conductive posts rather than the spacers shown in FIG. 10.

Electrically continuous with the posts 84 and residing on the dielectric layer 83 are conductors 94 which serve the same purpose as the electrodes 152 in FIGS. 9 and 11. These conductors 94 are energized by the addressing circuit 85 or by other circuitry to impose a selected potential on the membrane 82 and, accordingly, on the member 88, relative to the control electrode 86a.

The potential imposed on the member 88 interacts with the potential imposed on the control electrode 86a to move the member 88 out of its first position. Instead of setting the value of the capacitance of the device 80 as in other embodiments, movement of the member 88 out of the first position results in the member 88 being moved to a second position, as indicated by the broken fine 96 in FIG. 9(a). In its second position, the member 88 engages both output electrodes 86b rendering them electrically continuous with the member 88. The member 88 and the output electrodes 86b, accordingly, constitute a switch 86b,88 which is "open" when the member 88 is in the first position and is "closed" when the member 88 is in its second position 96. The output electrodes 86b may be connected to, or may constitute the termini of, respective transmission lines 98. The transmission lines 98 may reside on the dielectric layer 87.

The device or switch 80 of FIG. 18 may, as described above, be used to selectively switch transmission fines 98. Similarly, selective, digital positioning of the member 88 may be used to block or unblock an optical path which extends perpendicular to the direction of movement of the member 88 between its first and second positions. This selective movement of the member 88 is controlled by the potentials imposed on the member 88 and on the control electrode 86a by the addressing circuit 85 or other facilities. Thus, the switch 80 may serve as an electrical or optical switch. The fines 98,98 may be rendered selectively continuous by terminal switches 80 between which are serially/parallely connected variable capacitors according to earlier Figures for adjusting the impedance between the lines 98,98.

The switch 80 may be used to switch microwave and millimeter-wave high frequency signals present on the transmission lines 98. To this end, the substrate 83, which in earlier embodiments is typically silicon, may be GaAs or other suitable material. Of course, GaAs may also be used for the various substrates of the earlier described embodiments if high frequency input signals are applied to the capacitors thereof. The stray and other capacitance and the parasitic and other resistance of the switch 80 may be adjusted and selected to achieve selected goals, such as minimized stray capacitance—and minimized isolation—when the switch 80 is "open" and minimized parasitic resistance—and minimized insertion loss—when the switch 80 is "closed." The material, shape and other parameters of the membrane 82 may also be adjusted or selected to achieve selected impedance matching between the transmission lines 98 when the switch 80 is "closed." One technique which may be used to "tune" the switch 80, as well as the earlier described capacitors, is the selective removal of small portions of the margins 90 of an otherwise complete switch 80 (or the membranes or beams of the capacitors). Such selective removal may be effected by an appropriately shaped and sized bean of energy, such as that produced by a trimming laser or similar apparatus. The thickness of the margins 90 (and of the membranes and beams) may also be adjusted or selected to achieve a desired compliance so as to minimize or otherwise select the voltage magnitude required to "close" the switch 80 (or to adjust capacitance).

The switch 80 may be configured to perform multiple "throws" instead of the single "throw" illustrated and described. For example, if the membrane 82 deforms curvilinearly rather than planarly, a first amount of deflection or deformation may permit the membrane 82 to bridge and interconnect two closely spaced electrodes, similar to electrodes 86b, while a second, greater amount of deformation may result in the membrane 82 additionally bridging two other electrodes, also similar to the electrodes 86b, which are farther apart. The foregoing multiple "throw" scheme may also be implemented by the use of two or more switches 80, each selectively interconnecting respective pairs of transmission lines 98,98. The switches 80 may be electrically associated so that a first control signal closes one thereof while a second larger input signal closes two thereof, and so on. Appropriate association of plural switches 80 controlling respective transmission lines 98 or delay lines may also permit in digital selection of the lines. Two or more switches 80 may be put in series to increase isolation, while if put in parallel, the switches 80 will reduce insertion loss.

FIG. 19 depicts a device 160 which serves as a variable capacitor. The variable capacitor 160 of FIG. 19 combines certain constructional features of different previously described capacitors. For example, a deformable membrane 162, similar to that found in FIGS. 2–4, 6 and 18 is supported between a conductive post 164, similar to the post shown in FIGS. 9, 11 and 18, and an insulative spacer 166, similar to that shown in FIGS. 2–4, 6–8, 10, 12, 16 and 17. The capacitor may function in series with an input signal, along the lines of the capacitor 40S shown in FIG. 4, and to that end, may also includes an output electrode 168 below the membrane 162 and residing on a substrate 170 which ultimately supports the other elements. The output electrode 168 may be covered with a non-conductive oxide 172 which "sets" the maximum capacitance and which prevents mechanical engagement and shorting between the membrane 162 and the output electrode 168 when the former is deformed or deflected out of its first, normal position.

In the capacitor 160 of FIG. 19, control signals which may be produced by an address circuit shown only generally at 174, are applied to the post 164 by a conductor 176 electrically continuous therewith. The post is electrically continuous with the membrane 162 so that signals on the conductor 176 are applied to the membrane 162. The output electrode 168 also serves as a control electrode 178 so that the low frequency potential between the membrane 162 and the electrode 168/178 sets the capacitance of the capacitor 160. High frequency input signals are also applied to the conductor 176 where they are selectively affected by the capacitor 160. As with other embodiments, the addressing circuit 174 or other facilities may produce or modify the control signals and the input signals.

The capacitor 160 may be used with high frequency, millimeter-wave or microwave input signals. Again, to permit such use, the substrate 170 may be GaAs or other suitable material. As should be obvious, the capacitor 160 may function in parallel with the input signal, similar to the capacitor 40P of FIG. 3, by replacing the insulative spaces 166 with a post, similar to the post 164 and grounding the substrate 170 or providing thereon a grounded electrode subjacent to the membrane 162. Parallel and serial combinations of plural capacitors 160 (and of the earlier described capacitors) may be utilized to achieve digitally selectable capacitance ranges. Such combinations of capacitors 160 may find use in variable filters and impedance matching networks, and may be used to adjust the passband or stopband frequencies of communication or radar systems. Combinations of the capacitor 160 may also be used to tune high-frequency oscillators and, when combined with a feedback loop, to compensate for drift caused by aging or other effects.

FIG. 20 depicts variable impedance transmission lines 180 which include variable capacitors, shown only generally at 182, which incorporate the principles of the present invention. The capacitors 182 may take the form of any of the previously described embodiments, and are shown as being similar to the capacitor 40S in FIG. 3, various elements, such as the electrodes 46 and the control and input signal facilities not being shown in FIG. 20. The transmission lines 180 include a continuous metal membrane 184, periodically supported above a substrate 186 by separated spacers 188 and a ground plane 190. The spacers are insulative and, in effect, divide the continuous membrane 184 into separate deformable or deflectable members 192, each of which is supported on two diametric sides above a portion 186' of the substrate 186 and is present in one of the capacitors 182. Thus, each capacitor 182 effectively comprises a movable plate or member 192 overlying a stationary plate or associated substrate portion 186'. The continuous membrane 182 serves to render electrically continuous adjacent capacitors 182, thereby functioning as the output and connection 120 and 122 in FIG. 3. Addressing circuits, generally indicated at 194, are formed on and in the substrate 186 and selectively produce appropriate electrostatic fields between the stationary plate 186' and the movable plate 192 of each capacitor 182 to selectively and independently adjust the capacitance thereof.

Figure 20A:
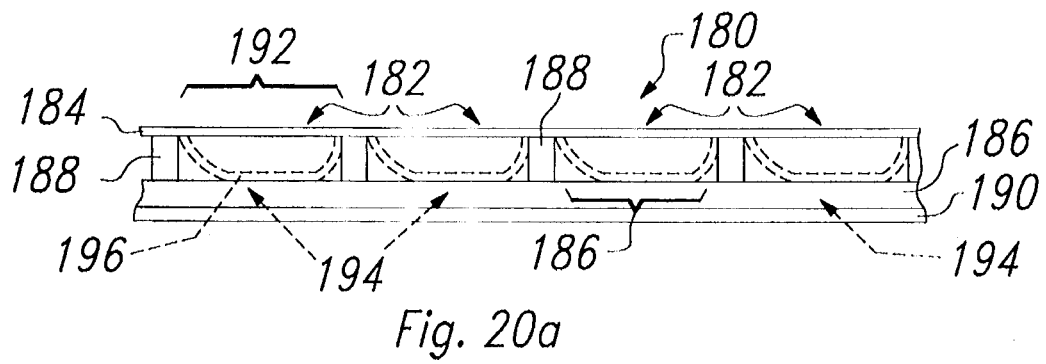
FIG. 20(a)–20(c) depict, respectively, a side, sectioned view and plan views of a plurality of membrane types of DMD SLM's used as variable impedance strip transmission lines.
Figure 20B:
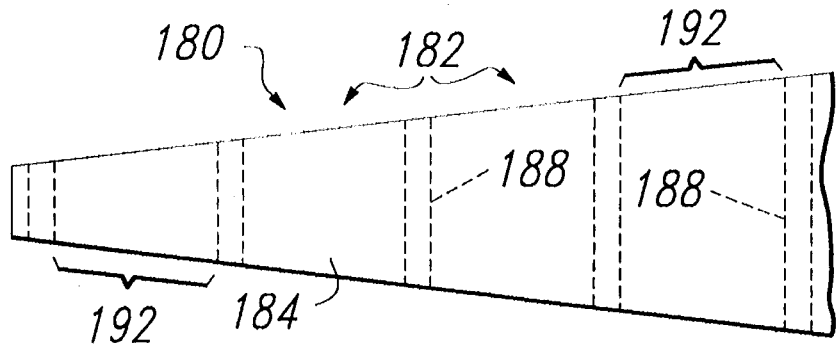
Figure 20C:
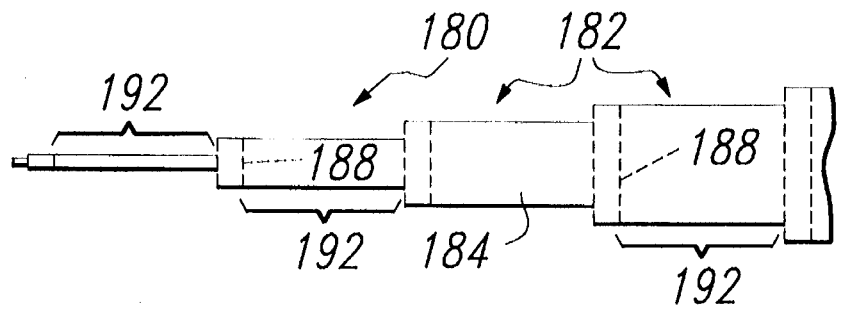
Figure 21A:
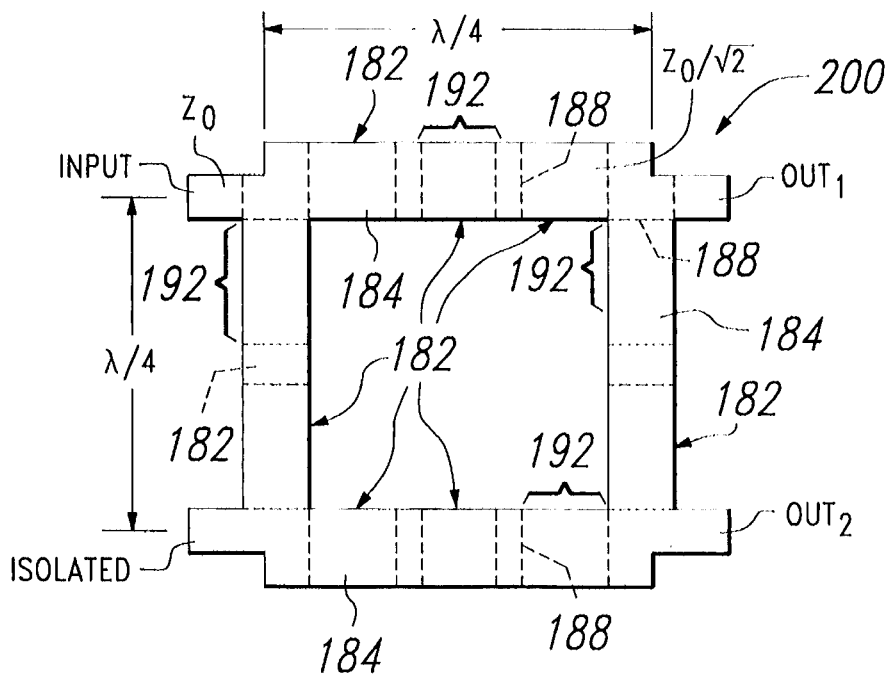
FIG. 21(a)–21(d) depict generalized plan views of four tunable, frequency-agile couplers each utilizing multiple DMD SLM's according to the principles of the present invention.
Figure 21B:
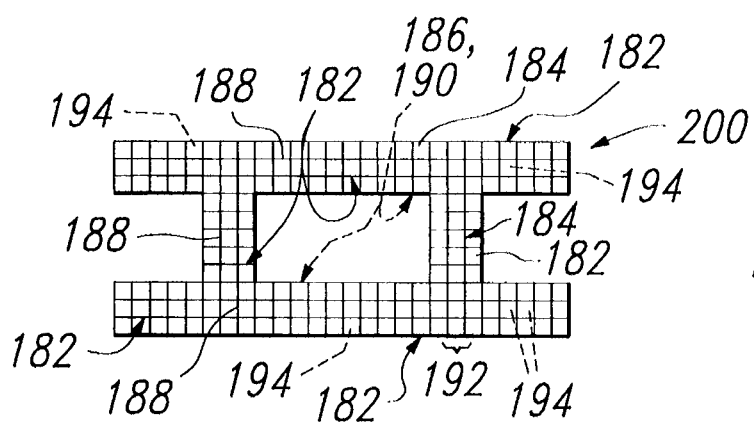
Figure 21C:
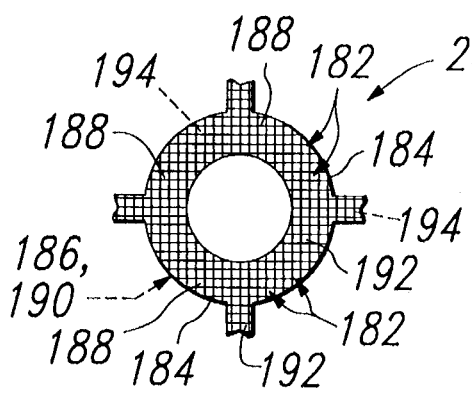
Figure 21D:
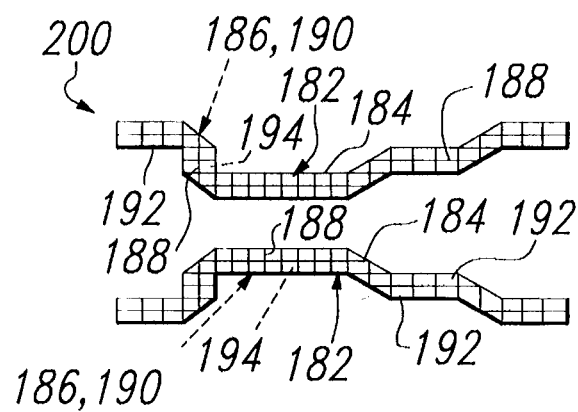

The width of each member 192 may be constant or may be different from that of the adjacent members 192 as shown in FIGS. 20(b) and 20(c). Accordingly, the effective area, and therefore the capacitance, of each capacitor 182 may be different. Each member 192 is digitally, movable or deflectable, that is, each member 192 is either in its first position, as shown in solid lines in FIG. 20(a), or in a fully deflected second position, represented by broken lines 196. Each member 192 may also be movable in analog fashion, i.e., by an amount proportional to the control signal 102. Thus, each capacitor 182 may have a unique minimum, maximum or intermediate capacitance value relative to the respective capacitances of the other capacitors. In FIG. 20(b) the variation in width of the members 192 is achieved by smooth transitions, while in FIG. 20(c) the transitions are stepped.

Preferably, the inductance per unit length of each member 192 is made large. This may be achieved by foxing the members 192 as long, narrow structures, best illustrated by FIG. 20(c). Although not specifically depicted in FIG. 20, large inductance per unit length may also be achieved by increasing the distance between adjacent spacers 188 or decreasing the width of the members 192.

By selectively adjusting the capacitance to ground of each capacitor 182, the overall capacitance of the transmission lines 180 may be altered as desired. By using the transmission lines 180 to transmit signals having wavelengths and frequencies comparable to the dimensions of the members 192 and by including the transmission lines 180 with other resonant or coupled devices or topologies, impedance adjustability and performance may be selected over wide, nearly infinite ranges.

Capacitors such as those 182 in FIG. 20 may be incorporated into a wide variety of tunable or frequency-agile couplers 200 which are generally illustrated in FIG. 21, in which similar elements bear the same reference numerals as in FIG. 20. In FIGS. 21(*b*)–25, the devices or capacitors 182 and 80 are generally shown as rectangular areas which is intended to convey only the location thereof, the specific structure being as depicted in earlier Figures.

FIG. 21(*a*) is a tunable branch line coupler, the branches of which each include a single row of capacitors 182 as in the transmission lines 180. FIGS. 21(*b*)–21(*d*) are, respectively, a tunable branch line coupler, a tunable rat race coupler and a tunable asymmetric coupler, in the branches of each of which there are present arrays of the capacitors 182. The frequency of operation and the coupling of each coupler 200 changes as the characteristic impedance thereof is changed by selective adjustment of the capacitance of the capacitors 182. Typically, the width of the members 192 of the capacitors 182 used in the couplers 200 have, but need not necessarily have, constant widths, rather than the varying widths of FIG. 20. As with the frequency-agile transmission lines 180, the substrate on which the couplers 200 are formed may be tailored to meet the requirements of the input signals with which they are used. For example, when the input signals are microwave of millimeter-wave signals, the substrates 186 may be GaAs or other suitable material with address circuits 194 also appropriate formed in and on the substrates 186. Also, if loss considerations so dictate, the members 192 of the capacitors 182—as well as the members of previously described devices according to the present invention—may include or be covered with gold or other suitable metal to reduce high frequency losses. The gold may be deposited in any expedient manner, such as by vapor deposition or plating.

Figure 22:
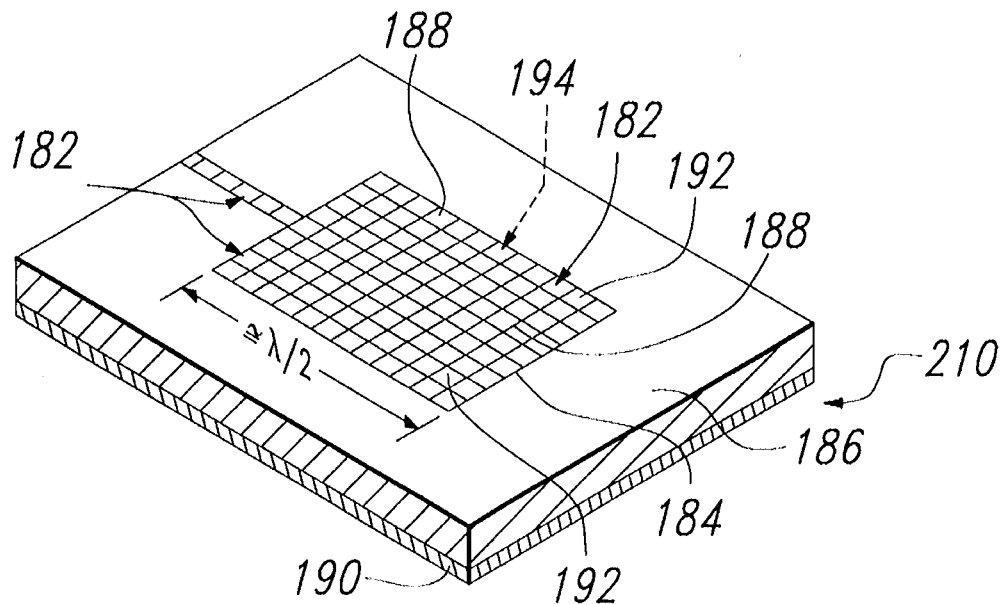
FIG. 22 generally shows a perspective view of a frequency-agile and pattern-agile patch antenna which contains plural DMD SLM's according to the principles of the present invention.

Capacitors 182 and arrays thereof which are similar to or the same as those used in the transmission lines 180 and the couplers 200 of FIGS. 20 and 21 may be incorporated into radiating and absorbing structures, such as antennas of all types. Frequency-agile and pattern-agile antennas which may utilize the capacitors 182, et al, of the present invention include patch; spiral; slot; microstrip (e.g., a patch radiator fed by a hybrid coupler of the type shown in FIG. 21(*a*) or 21(*b*)) of all shapes, including square, disk, rectangular, ellipse, pentagon, ring, triangle and semi-disk; arrays of all types, including microstrip antenna arrays; and phased arrays and coupled structures of all types. FIG. 22 depicts only a portion of a frequency-agile and pattern-agile patch antenna 210 which incorporates an array of capacitors 182 according to the principles of the present invention. The incorporation of such capacitors 182 into other antennas will be apparent to those skilled in the art after referring to this specification.

When the capacitors 182 are incorporated into an antenna, such as that 210 shown in FIG. 22, the substrate 186 may be made of quartz or other antenna-suitable material. Moreover, depending on the frequencies of the transmitted or received input signals, the members 192 of the array of capacitors 182 may include or be covered with a low ohmic loss metal such as gold. According to the present invention, each capacitor 182 forming the antenna 210 is individually and independently addressable to adjust the impedance of each such capacitor 182 for a given frequency of input signal 114. As noted, adjustment of the capacitance adjusts the impedance of the antenna 210, as well as its radiating/absorbing pattern and wavelength. In this fashion the antenna 210 may be tuned for a specific radiation pattern and frequency range.

Figure 23A:
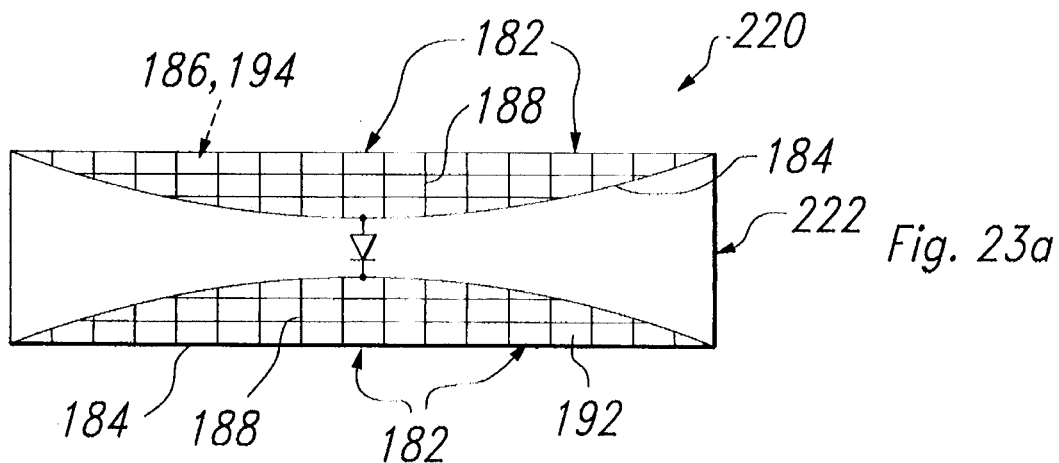
FIG. 23(a)–23(b) are a generalized side, sectioned view and plan view of a FIN line containing arrays of DMD SLM's operating as variable capacitors for tuning thereof.
Figure 23B:
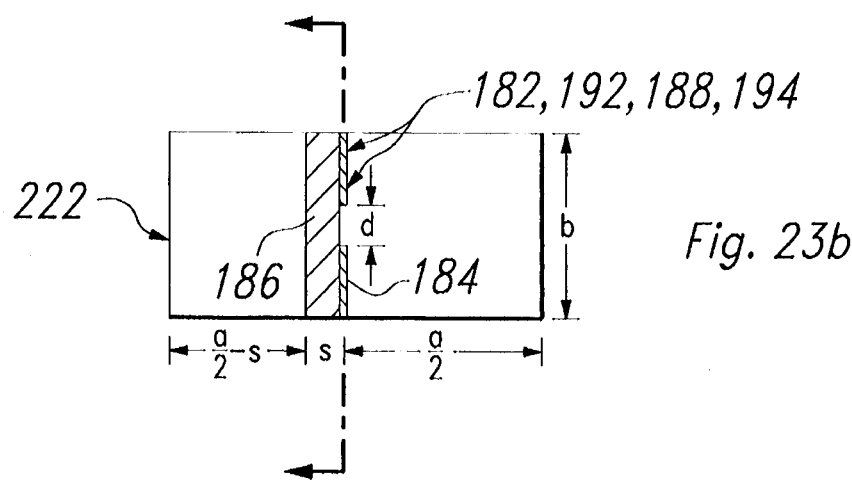

As should be apparent, arrays of the capacitors 182 incorporated into a wide variety of other electrical devices, including devices particularly useful at millimeter-wave and microwave frequencies, such as fin lines, waveguide to microstrip transitions, resonator filters, resonators and filters. FIG. 23 portrays two aspects of a portion of a fin line 220 which contains an array of the capacitors 182, while FIG. 24 depicts an array of capacitors 182 incorporated into a waveguide-to-microstrip transition 230. The waveguide 232 may include a wedge or fin line 236, which may be similar to the fin line 220 of FIG. 23, while the microstrip 234 may be similar to the transmission line 180 of FIG. 20 and may include or be fed by a coupler, such as those 200 shown in FIG. 21.

Another use for arrays of the principles of the present invention which is more related to the switch 80 of FIG. 18 than to the capacitors 182, is incorporation thereof into some or all of the interior surfaces of the walls of a waveguide 240, as shown generally in FIG. 25. In this embodiment, movement of the members 88 of the device or switch 80, which members 80 serve as a portion of the interior surface of the waveguide 240, selectively reduce (or increase) the cross-section of the waveguide 240, thereby altering the electrical characteristics thereof. When reducing the cross-section of the waveguide 242, the members 88 are repelled from the control electrode 86*a* by potentials of the same polarity on the members 88 and the control electrode 86*a*.

Those skilled in the art will appreciate that various changes and modifications may be made in and to the above-described embodiments of the present invention without departing from the spirit, scope or coverage of the following claims.

What is claimed is:

1. A microminiature, monolithic signal processor, comprising:
   (a) a variable electrical capacitor, comprising:
      (i) a substrate,
      (ii) an electrically conductive member monolithically formed with and spaced from the substrate, the respective plates of the capacitor being the member and the substrate,
      (iii) means for mounting the member for deflection of a portion thereof toward and away from the substrate and for storing energy when the portion of the member deflects out of a normal position, the stored energy tending to return the deflected portion of the member to the normal position,
      (iv) a control electrode monolithically formed with the substrate and the member, the electrode being spaced from the member along the direction of deflection of the portion of the member out of the normal position, the control electrode and the member being capable of having impressed therebetween a control signal sufficient to produce a field therebetween to deflect the portion of the member out of its normal position so as to vary the capacitance of the capacitor, and
   (b) signal means applying a time-varying electrical input signal to the signal processor which said input signal is modulated as a function of the capacitance of said variable capacitor.

2. A signal processor as in claim 1, wherein:

the mounting means comprises a compliant facility centrally supporting the member.

3. A signal processor as in claim 2, wherein:

the compliant facility is a membrane.

4. A signal processor as in claim 3, wherein:

the membrane is an elastomer.

5. A signal processor as in claim 3, wherein:

the membrane is a conductive metal.

6. A signal processor as in claim 1, wherein:

the mounting means comprises a compliant facility integrally formed with the member and the input-signal-applying means.

7. A signal processor as in claim 6, wherein:

deflection of the portion of the member comprises rotation of the member about an axis which is asymmetric relative to the member.

8. A signal processor as in claim 6, wherein:

deflection of the portion of the member comprises rotation of the member about an axis which is symmetric relative to the member.

9. A signal processor as in claim 6, wherein:

deflection of the portion of the member comprises rotation of the member about an axis, and the field is bounded by the control electrode and the portion of the member, the portion being spaced from the axis.

10. A signal processor as in claim 9, wherein:

the axis is symmetric relative to the member.

11. A signal processor as in claim 9, wherein:

the axis is asymmetric relative to the member.

12. A signal processor as in claim 6, wherein:

the compliant facility includes a torsion spring.

13. A signal processor as in claim 6, wherein:

the compliant facility is a cantilever spring.

14. A signal processor as in claim 6, wherein:

the compliant facility comprises a membrane.

15. A signal processor as in claim 14, wherein:

a portion of the membrane comprises a part of the member.

16. A signal processor as in claim 15, wherein:

the member moves in a piston-like fashion as the portion thereof is deflected toward and away from the substrate.

17. A signal processor as in claim 16, wherein:

the member and the membrane are integral, the membrane having high compliance and the member having low compliance.

18. A signal processor as in claim 17, wherein:

the member is smaller than and is generally centrally located with respect to the membrane.

19. A signal processor as in claim 6, wherein:

the compliant facility comprises a flexure system made up of a plurality of cantilever-torsion springs.

20. A signal processor as in claim 19, wherein:

the member moves in a piston-like fashion as the portion thereof is deflected toward and away from the substrate.

21. A signal processor as in claim 6, wherein:

the complaint facility comprises means for permitting the member to move in piston-like fashion as the portion thereof is deflected toward and away from the substrate.

22. A signal processor as in claim 6, wherein:

the mounting means further comprises:

an insulative spacer on the substrate and monolithically formed with the substrate, the member and the control electrode, the spacer supporting the compliant facility.

23. A signal processor as in claim 22, wherein:

the insulative spacer defines a portion of a boundary of a well into and out of which the portion of the member moves as it deflects toward and away from the substrate.

24. A signal processor as in claim 23, wherein:

the spacer is a photoresist.

25. A signal processor as in claim 6, wherein:

the mounting means further comprises an electrically conductive post on the substrate and monolithically formed with the substrate, the member and the control electrode, the post supporting the compliant facility.

26. A signal processor as in claim 25, wherein:

the post defines a portion of a boundary of a well into and out of which the portion of the member moves as it deflects toward and away from the substrate.

27. A signal processor as in claim 26, wherein:

the member and the compliant facility are electrically conductive, the post being electrically continuous with the member via the compliant facility, and the post is electrically insulated from the substrate.

28. A signal processor as in claim 1, wherein:

the control electrode comprises a region of the substrate.

29. A signal processor as in claim 28, which further comprises:

means for applying the control signal between the substrate region and the member, and the signal means includes a conductive input path and a conductive output path both electrically continuous with the member so that the input signal passes through the portion of the member.

30. A signal processor as in claim 29, wherein:

the signal means comprises the substrate region, and one of the conductive paths electrically continuous with the member.

31. A signal processor as in claim 30, wherein:

the substrate region is grounded.

32. A signal processor as in claim 31, wherein:

the input signal is time-varying, and the frequency of the control signal is substantially less than that of the input signal.

33. A signal processor as in claim 32, wherein:

the control signal is substantially non-time-varying.

34. A signal processor as in claim 33, wherein:

the frequency of the input signal is sufficiently high with respect to the resonant frequency of the member so that the portion of the member cannot deflect in response thereto.

35. A variable capacitor which includes the signal processor of claim 32, wherein:

the frequency of the input signal is sufficiently high with respect to the resonant frequency of the member so that the portion of the member cannot deflect in response thereto, and the frequency of the control signal is sufficiently low with respect to the resonant frequency of the member so that the portion of the member deflects substantially in synchronism therewith.

36. A signal processor as in claim 30, wherein:

the input signal and the control signal are superimposed.

37. A signal processor as in claim 1, which further comprises:

an electrically insulative dielectric layer on the substrate for supporting the control electrode on, and insulating it from, the substrate.

38. A signal processor as in claim 37, which further comprises:

means for applying the control signal between the control electrode and the member, and the signal means includes a conductive input path electrically continuous with the member and a conductive output path spaced from the member along the direction of deflection of the portion of the member, the output path being supported on and insulated from the substrate so that the input signal is applied by the portion of the member, acting as one plate of the capacitor, to the output path acting as the other plate of the capacitor.

39. A signal processor as in claim 38, wherein:

the signal means comprises the control electrode, and the conductive input path.

40. A signal processor as in claim 39, wherein:

the input signal is time-varying, and the frequency of the control signal is substantially less than that of the input signal.

41. A signal processor as in claim 40, wherein:

the control signal is substantially non-time-varying.

42. A signal processor as in claim 41, wherein:

the frequency of the input signal is sufficiently high with respect to the resonant frequency of the member so that the portion of the member cannot deflect in response thereto.

43. A variable capacitor which includes the signal processor of claim 40, wherein:

the frequency of the input signal is sufficiently high with respect to the resonant frequency of the member so that the portion of the member cannot deflect in response thereto, and the frequency of the control signal is sufficiently low with respect to the resonant frequency of the member so that the portion of the member deflects substantially in synchronism therewith.

44. A signal processor as in claim 38, wherein:

the input signal and the control signal are superimposed.

45. A signal processor as in claim 37, wherein:

the substrate is a semiconductor, and the dielectric layer is made of a material selected from the group consisting of an insulative oxide, an insulative nitride and a polymer.

46. A signal processor as in claim 45, wherein:

the semiconductor is silicon or gallium-arsenide, the insulative oxide is a silicon oxide, the insulative nitride is a silicon nitride, and the polymer is an epoxy or an acrylate.

47. A signal processor as in claim 45, wherein:

the output path is supported on and insulated from the substrate by the dielectric layer.

48. A signal processor as in claim 1, wherein:

the substrate comprises a material selected from the group consisting of semiconductors, ceramics, aluminas, diamond and quartz.

49. A signal processor as in claim 1, which further comprises:

means for preventing the member from touching the control electrode when the portion of the member moves toward the substrate.

50. A signal processor as in claim 1, wherein:

the member is generally planar, and the mounting means mounts the member for generally coplanar, translational movement of substantially the entire member.

51. A signal processor as in claim 50, which further comprises:

a membrane, one portion of which comprises a part of the mounting means and another portion of which comprises a part of the member.

52. A signal processor as in claim 50, wherein:

the member is a substantially rigid plane, and the mounting means is a flexure system made up of a plurality of cantilever-torsion springs.

53. A signal processor as in claim 1, wherein:

the member is generally planar, and the mounting means mounts the member for generally rotational movement about an axis remote from the centroid of the member.

54. A signal processor as in claim 53, wherein:

the mounting means is a torsion spring.

55. A signal processor as in claim 53, wherein:

the mounting means is a cantilever spring.

56. An electrical circuit which includes the signal processor of claim 1 and wherein:

the signal means comprises means for grounding the substrate, and means for connecting the member to a node of the circuit so that the voltage to ground on the node is applied to the member, whereby the signal processor is in shunt with the node.

57. An electrical circuit which includes the signal processor of claim 1 and wherein:

the signal means comprises means for connecting the member to a first node of the circuit so that current into the first node is applied to the member, and means for connecting the substrate to a second node so that current out of the second node flows from the substrate, whereby the signal processor is in series with the nodes.

58. An electrical circuit which includes the signal processor of claim 1 and which further comprises:

means for applying to the control electrode a control signal independent of the signal processor-affected input signal.

59. An electrical circuit which includes the signal processor of claim 1 and which further comprises:

means for applying to the control electrode a control signal derived from the signal processor-affected input signal.

60. A signal processor as in claim. 1, wherein:

selected characteristics of the compliant facility are alterable so that the movement of the portion of the member and, hence, the capacitance of the signal processor, both of which are effected by the application of a selected control signal to the control electrode, are adjustable.

61. A signal processor as in claim 60, wherein:

characteristic-alteration of the compliant facility is achievable by selective removal of a portion of the compliant facility.

62. A signal processor as in claim 61, wherein:

selective material removal is achievable by selective application of concentrated radiant energy to the compliant facility.

63. A signal processor as in claim 1, wherein:

the control electrode is a section of the substrate.

64. A signal processor as in claim 1, wherein:

the control electrode is a conductive region formed on the substrate.

65. A signal processor as in claim 64, wherein:

the conductive region is insulated from the substrate.

66. A transmission line which includes one or more signal processors according to claim 1 for varying the impedance thereof.

67. A transmission line as in claim 66 of the variable impedance, microstrip type.

68. An impedance matching network which includes one or more signal processors according to claim 1 for varying the impedance thereof.

69. A filter network which includes one or more signal processors according to claim 1 for varying the impedance thereof.

70. An antenna which includes one or more signal processors according to claim 1 for varying the impedance and the frequency characteristics thereof.

71. An antenna as in claim 70, wherein:

the member is an element of the radiating or receiving surface of the antenna.

72. An antenna as in claim 71 of the patch type.

73. An antenna as in claim 71 of the spiral type.

74. An antenna as in claim 71 of the slot type.

75. A coupler which includes one or more of the signal processors according to claim 1 for varying the impedance thereof.

76. A coupler as in claim 75 of the symmetric type.

77. A coupler as in claim 75 of the asymmetric type.

78. A coupler as in claim 75 of the rat race type.

79. A waveguide having at least one surface which comprises one or more of the signal processors according to claim 1 for varying the impedance thereof.

80. A fin line including one or more of the signal processors according to claim 1 for varying the impedance thereof.

81. A signal processor as in claim 1, wherein:

the normal position of the member is away from the substrate and when the member is deflected it is closer to the substrate.

82. A signal processor as in claim 1, wherein:

the normal position of the member is toward the substrate and when the member is deflected it is farther from the substrate.

83. A microminiature, monolithic signal processor, comprising:

(a) a variable capacitor, comprising:
 (i) a substrate,
 (ii) a member monolithically formed with and spaced from the substrate, a region of the substrate and a portion of the member acting as the respective plates of the capacitor,
 (iii) means for mounting the member for deflection of the portion thereof toward and away from the substrate region and for storing energy when the portion of the member deflects out of a normal position, the stored energy tending to return the deflected portion of the member to the normal position,
 (iv) means for selectively deflecting the portion of the member out of its normal position to vary the capacitance of the signal processor, and (b) signal means applying a time-varying electrical input signal to the capacitor which said input signal is modulated as a function of the capacitance of said variable capacitor.

84. A signal processor as in claim 83, wherein:

the selective deflecting means includes means for producing an electric field bounded in part by the portion of the member, the electric field deflecting the portion of the member relative to the substrate by an amount proportional to the magnitude thereof.

85. A signal processor as in claim 84, wherein:

the electric field is produced by a voltage having a frequency such that the portion of the member deflects substantially in synchronism therewith.

86. A signal processor as in claim 85, wherein:

the voltage is non-time-varying.

87. A signal processor as in claim 84, wherein:

the deflection field produced by the field-producing means is bounded in part by the region of substrate.

88. A signal processor as in claim 87, wherein:

the deflection field is produced by a voltage having a frequency such that the portion of the member deflects in synchronism therewith.

89. A signal processor as in claim 88, wherein:

the voltage is non-time-varying.

90. A signal processor as in claim 89, wherein:

the deflection voltage is applied between the substrate and the member.

91. A signal processor as in claim 90, wherein:

the input signal is a voltage having a frequency which is sufficiently high with respect to the resonant frequency of the member such that the portion of the member is incapable of deflecting in response thereto.

92. A signal processor as in claim 91, wherein:

the input voltage is superimposed on the deflection voltage.

93. A signal processor as in claim 92, wherein:

the field-producing means includes a control electrode associated with the substrate region, which electrode in part bounds the electric field which deflects the portion of the member by an amount determined by the magnitude thereof.

94. A signal processor as in claim 93, wherein:

the electric field is produced by a voltage applied to the control electrode and having a frequency such that the portion of the member deflects substantially in synchronism therewith.

95. A signal processor as in claim 94, wherein:

the deflection voltage is non-time-varying.

96. A signal processor as in claim 95, wherein:

the deflection voltage is applied between the control electrode and the member and the input voltage is applied to the member.

97. A signal processor as in claim 96, wherein:

the control electrode and the mounting means are monolithically formed with the substrate and the member.

98. A signal processor as in claim 97, wherein:

the mounting means comprises a deformable membrane on which the member resides, and a support on the substrate to which the membrane is attached.

99. A signal processor as in claim 98, wherein:

the member comprises a first compliance, rigid element residing on the membrane, portions of the membrane surrounding the member having a second compliance higher than that of said first compliance.

100. A signal processor as in claim 99, wherein:

the member and the membrane are electrically conductive and integral and the member is thicker than the membrane.

101. A signal processor as in claim 100, wherein:

the support is a conductive post on and insulated from the substrate.

102. A signal processor as in claim 100, wherein:

the support is an insulative spacer on the substrate.

103. A signal processor of the type set forth in claim 83, wherein:

the selective deflecting means deflects the portion of the member with respect to time, the frequency of such deflection being independent of the frequency of the input signal.

104. A signal processor as in claim 103, wherein:

the frequency of the deflection is smaller than the frequency of the input signal.

105. A signal processor as in claim 103, wherein:

the deflecting means includes
electric field-producing means for producing an electric field which deflects the member out of the normal position.

106. A signal processor as in claim 105, wherein:

the control electrode and the region are substantially coplanar.

107. A signal processor as in claim 103, wherein:

the field-producing means includes
a control electrode which in part bounds the electric field which deflects the portion of the member toward the region by an amount proportional to the magnitude thereof.

108. A signal processor as in claim 107, wherein:

the control electrode and the region are formed on the substrate.

109. A signal processor of the type set forth in claim 83, wherein:

the selective deflecting means deflects the portion of the member with respect to time, the frequency of such deflection being substantially the same as the frequency of the input signal.

110. A signal processor as in claim 109, wherein:

the selective deflecting means is the input signal-applying means.

111. A signal processor as in claim 110, wherein:

the deflection voltage is substantially non-time-varying.

112. A signal processor as in claim 111, wherein:

the segments are insulated from each other and from the substrate.

113. A signal processor as in claim 109, wherein:

the electric field is produced by a voltage applied to the control electrode and having a frequency such that the portion of the member deflects substantially in synchronism therewith.

114. A signal processor as in claim 113, wherein:

the control electrode and the region include
respective interdigitated segments all of which are generally aligned with the portion of the member as it deflects.

115. A microminiature, monolithic signal processor, comprising:

(a) a variable capacitor, comprising:
(i) a substrate,
(ii) a microminiature member monolithically formed with and spaced from the substrate,
(iii) an electrically conductive region spaced from a portion of the member, the region and the portion of the member acting as the respective plates of a parallel plate capacitor,
(iv) means for mounting the member for deflection of the portion thereof toward and away from the region and for storing energy when the portion of the member deflects out of a normal position toward the region, the stored energy tending to return the deflected portion of the member to the normal position,
(v) means for selectively deflecting the portion of the member out of its normal position toward the region to vary the capacitance of the capacitor, and (b) signal means applying a time-varying electrical input signal to the capacitor which said input signal is modulated as a function of the capacitance of said variable capacitor.

116. A signal processor as in claim 115, wherein:

the deflection voltage is applied between the control electrode and the member and the input voltage is applied between the region and the member.

117. A microminiature, monolithic device, which comprises:

a substrate, a movable member which in a first normal position affects an input signal in a first mode and which affects the input signal in a second mode when not in the first position, means for mounting the member at a location spaced from the substrate for movement of the member toward and away from the substrate and for storing energy when the member moves out of the first position, the stored energy biasing the member toward the first position, means applying a time-varying electrical said input signal to the device, means for selectively applying a control signal to the member, and means responsive to the control signal for selectively moving the member out of the normal position to selectively alter the mode in which the member affects the input signal.

118. A device as in claim 117, wherein:

the member is electrically conductive and the application of the control signal thereto produces an electrostatic field acting thereon which moves the member out of the first position relative to the substrate.

119. A variable electrical capacitor which includes a device as in claim 118, wherein:

the member is one plate of the variable electrical capacitor, movement of the member by the electrostatic field altering the capacitance of the capacitor, and the input signal and the control signal are both applied to the member.

120. A variable electrical capacitor as in claim 119, wherein:

the path taken by the input signal is in parallel with the alterable capacitance of the capacitor.

121. A variable electrical capacitor as in claim 119, wherein:

the path taken by the input signal in series with the alterable capacitance of the capacitor.

122. A device as in claim 118, wherein:

the electrostatic field moves the member toward the substrate.

123. A variable capacitor which includes a device as in claim 118, wherein:

the member is one plate of the variable capacitor, movement of the member altering the capacitance of the capacitor.

124. A variable capacitor as in claim 123, wherein:

the capacitor is in parallel with the input signal.

125. A variable capacitor as in claim 123, wherein:

the capacitor is in series with the input signal.

126. A variable capacitor which includes a device as in claim 118 for use with a time-varying input signal, wherein:

the selective moving means moves the member with respect to time, the frequency of such movement being independent of the frequency of the input signal.

127. A variable capacitor as in claim 126, wherein:

the frequency of the movement is smaller than the frequency of the input signal.

128. A non-linear capacitor which includes a device as in claim 118 for use with a time-varying input signal, wherein:

the selective moving means moves the member with respect to time, the frequency of such movement being the same as the frequency of the input signal.

129. A non-linear capacitor as in claim 128, wherein:

the selective moving means is the input signal-applying means.

130. A waveguide which includes the device of claim 117, wherein:

the movable member forms a coplanar portion of the interior surface of the waveguide in the first position, movement of the member out of the first position being away from the wall to effectively decrease the cross-section of the waveguide along a line generally parallel to the line of movement of the member.

* * * * *